(12) United States Patent
Harada et al.

(10) Patent No.: US 8,440,339 B2
(45) Date of Patent: May 14, 2013

(54) BATTERY MODULE, ELECTRIC STORAGE DEVICE AND ELECTRIC SYSTEM

(75) Inventors: Susumu Harada, Hitachinaka (JP); Masuhiro Onishi, Uji (JP); Seiichi Sato, Hitachinaka (JP); Yoshihisa Tsurumi, Hitachinaka (JP)

(73) Assignees: Hitachi, Ltd., Tokyo (JP); Hitachi Vehicle Energy, Ltd., Hitachinaka-shi (JP)

( * ) Notice: Subject to any disclaimer, the term of this patent is extended or adjusted under 35 U.S.C. 154(b) by 722 days.

(21) Appl. No.: 12/417,131

(22) Filed: Apr. 2, 2009

(65) Prior Publication Data

US 2009/0258282 A1 Oct. 15, 2009

(30) Foreign Application Priority Data

Apr. 3, 2008 (JP) ................................ 2008-097500

(51) Int. Cl.
*H01M 2/12* (2006.01)
(52) U.S. Cl.
USPC .................................. 429/83; 429/62; 429/82
(58) Field of Classification Search ............ 429/62, 429/83
See application file for complete search history.

(56) References Cited

U.S. PATENT DOCUMENTS

| 6,482,542 | B1 * | 11/2002 | Takaki et al. ................ 429/120 |
| 2004/0043287 | A1 | 3/2004 | Bando et al. |
| 2005/0095499 | A1 * | 5/2005 | Kanai et al. ..................... 429/83 |
| 2006/0115721 | A1 * | 6/2006 | Lee et al. ....................... 429/156 |
| 2006/0166087 | A1 * | 7/2006 | Ogata et al. ................... 429/153 |
| 2007/0238015 | A1 | 10/2007 | Kubota et al. |
| 2008/0050645 | A1 * | 2/2008 | Kai et al. ......................... 429/61 |
| 2008/0057382 | A1 | 3/2008 | Kimura |
| 2008/0233475 | A1 * | 9/2008 | Kozu et al. ..................... 429/159 |

FOREIGN PATENT DOCUMENTS

| JP | 10-3950 A | 1/1998 |
| JP | 2005-38678 A | 2/2005 |
| JP | 2005-183343 A | 7/2005 |
| JP | 2006-278140 A | 10/2006 |
| JP | 2008-130330 A | 6/2008 |
| WO | WO 2006/064695 A1 | 6/2006 |
| WO | WO 2008/109764 A1 | 9/2008 |

OTHER PUBLICATIONS

Extended European Search Report dated Sep. 3, 2009 (Five (5) pages).
European Office Action dated Aug. 1, 2011 (Five (5) pages).
Japanese Office Action dated Oct. 2, 2012 Including English-language translation (Four (4) pages).

\* cited by examiner

*Primary Examiner* — Ula C. Ruddock
*Assistant Examiner* — Patricia Davis
(74) *Attorney, Agent, or Firm* — Crowell & Moring LLP

(57) ABSTRACT

A battery module is configured so that the first cell string and the second cell string are arranged between the first plate member and the second plate member and the second cell string is arranged closer to the second plate member side than the first cell string is and is arranged closer to the outlet side than the first cell string is. At the inlet side of the housing, the inlet is arranged closer to the first plate member than to the second cell string, at least a part between the inlet side of the second cell string and the second plate member is covered by the inlet-side guide plate, and the cooling air is introduced into the housing through the inlet so as to form a flow of the cooling air along the first plate member and a flow of the cooling air along the inlet-side guide plate.

7 Claims, 13 Drawing Sheets

BATTERY MODULE, ELECTRIC STORAGE DEVICE AND ELECTRIC SYSTEM

CROSS-REFERENCE TO RELATED APPLICATION

The present application relates to subject matters described in a co-pending patent application Ser. No. 12/351,012 filed on Jan. 9, 2009 entitled "CELL MODULE".

INCORPORATION BY REFERENCE

The disclosure of the following priority application is herein incorporated by reference:
Japanese Patent Application No. 2008-097500 filed Apr. 3, 2008

BACKGROUND OF THE INVENTION

1. Field of the Invention

The present invention relates to a technology for a battery module including a plurality of cells, an electric storage device and an electric system.

2. Description of Related Art

Japanese Laid Open Patent Publication No. H10-3950 (patent literature 1) and Japanese Laid Open Patent Publication No. 2005-183343 (patent literature 2) disclose a technology for cooling cells.

Patent literature 1 discloses that a plurality of storage battery strings in which a plurality of cylindrical cells aligned with one another in the same axial direction are arranged in parallel. Patent literature 1 also discloses that a main cooling passage is formed between a dividing wall of a battery holding part and the storage battery strings and a sub cooling passage is formed between the battery holding parts in the horizontal direction, so as to supply a cooling medium along the storage battery strings and to allow the cooling medium to pass through the main cooling passage and the sub cooling passage. The technology disclosed in patent literature 1 allows the cooling medium passing through the sub cooling passage to merge into the cooling medium passing through the main cooling passage in the midstream or downstream, so as to reduce the temperature of the cooling medium which cools the cells arranged downward from the midstream or downstream in the storage battery strings, thereby improving the cooling efficiency of the cells arranged in the midstream or downstream in the storage battery strings.

Patent literature 2 discloses that a plurality of battery modules which include a plurality of cells serially connected and integrated into a rod shape are arranged in parallel and a staggered manner and cooling fluid is supplied from the direction along the plurality of battery modules. Patent literature 2 also discloses that a cooling air guide groove is formed in an inner surface of a battery case, whose cross-sectional area reduces along the direction from a cooling air inlet to a cooling air outlet. The technology disclosed in patent literature 2 allows the cooling air flowing through the cooling air guide groove to be guided from a vicinity of an intermediate point of a longitudinal side of the battery case to a middle battery module in a direction close to each other so as to cool the battery module effectively and reduce temperature rise in the battery module, resulting in prevention of performance degradation.

Cooling of cells for reducing temperature rise in the cells due to charge and discharge is essential for an electric storage device so as to improve battery performance, for example, to reduce variation in charge and discharge amount and lifetime of the cells.

In recent years, further improvement has been required for battery performance of an electric storage device. Means for achieving it include, as the related arts, further improvement in cooling performance of cells by providing the sub cooling passage in addition to the main cooling passage or by reducing the cross-sectional area of the passage in the battery case. However, although the related arts are effective for the electric storage device constituted with a battery module size of which is not restricted, they are not necessarily effective for the electric storage device made up with a battery module of a limited size, e.g. an electric storage device mounted in a small storage space as in an automobile. This encourages a new cooling structure that enables an improved cooling performance of cells.

SUMMARY OF THE INVENTION

A battery module according to a first aspect of the present invention comprises: a housing that comprises a first plate member with an elongated shape in a flow direction of a cooling air and a second plate member provided in a position facing the first plate member; a first cell string comprising a plurality of cells arranged along the first plate member; a second cell string comprising a plurality of cells arranged along the second plate member; an inlet through which the cooling air is introduced into the housing; an outlet through which the cooling air in the housing is discharged; an inlet-side guide plate provided on an inlet side of the housing; an outlet-side guide plate provided on an outlet side of the housing, wherein: the first cell string and the second cell string are arranged between the first plate member and the second plate member; the second cell string is arranged closer to the second plate member side than the first cell string is and is arranged closer to the outlet side than the first cell string is; at the inlet side of the housing, the inlet is arranged closer to the first plate member than to the second cell string, at least a part between the inlet side of the second cell string and the second plate member is covered by the inlet-side guide plate, and the cooling air is introduced into the housing through the inlet so as to form a flow of the cooling air along the first plate member and a flow of the cooling air along the inlet-side guide plate; and at the outlet side of the housing, the outlet is arranged closer to the second plate member than to the first cell string, and at least a part between the outlet side of the first cell string and the first plate member is covered by the outlet-side guide plate.

According to a second aspect of the present invention, in the battery module according to the first aspect, it is preferable that, at the inlet side of the housing, the cooling air collides with a cell disposed closest to the inlet side of the first cell string so as to form the flow of the cooling air along the first plate member and the flow of the cooling air along the inlet-side guide plate.

According to a third aspect of the present invention, in the battery module according to claim 1, it is preferable that a plurality of cooling passages are formed in the housing; and the plurality of cooling passages comprises: a first cooling passage that is formed between the first cell string and the first plate member and extends along the first plate member from the inlet; a second cooling passage that is formed between the second cell string and the second plate member and extends along the second plate member to the outlet; a third cooling passage that is formed by a gap between the cells and allows the first cooling passage and the second cooling passage to be communicated with each other; a fourth cooling passage that is formed between the inlet-side guide plate and cells disposed closest to the inlet side of the first cell string and the second cell string and extends from the inlet to the second cooling passage; and a fifth cooling passage that is formed between the outlet-side guide plate and cells disposed closest to the outlet side of the first cell string and the second cell string and extends from the first cooling passage to the outlet.

According to a fourth aspect of the present invention, the battery module according to the first aspect may further comprise: a discharge chamber, kept in isolation from a space in the housing, into which a discharge medium is discharged from the cells.

According to a fifth aspect of the present invention, the battery module according to the fourth aspect may further comprise: a pair of side plates that sandwich the first cell string and the second cell string, in which a connection conductor for electrically connecting the cells is embedded; and a cover member, disposed outside the housing, that covers each of the pair of side plates, wherein: the discharge chamber is formed with each of the pair of side plates and the cover member.

A battery module according to a sixth aspect of the present invention comprises: a battery housing package that comprises an inlet of a cooling medium on one end thereof and an outlet of the cooling medium on another end thereof; and an assembled battery held in the battery housing package and constituted by cells electrically connected with one another, wherein: the assembled battery comprises (a) a first cell string in which a plurality of the cells are arranged side by side along a direction from an inlet side to an outlet side with central axes of the plurality of the cells disposed in parallel with one another and (b) a second cell string in which a plurality of the cells are arranged side by side along the direction from the inlet side to the outlet side with central axes of the plurality of cells disposed in parallel with one another; the first cell string and the second cell string are stacked one on top of another; the first cell string is arranged closer to the inlet side than the second cell string is; the second cell string is arranged closer to the outlet side than the first cell string is; the inlet opens on an extension of a line along which the first cell string is arranged; and a cell arranged closest to the inlet of the first cell string functions as a diverter that diverts the cooling medium taken in through the inlet into at least two directions.

According to a seventh aspect of the present invention, in the battery module according to the sixth aspect, it is preferable that the outlet opens on an extension of a line along which the second cell string is arranged.

According to a eighth aspect of the present invention, in the battery module according to the sixth aspect, it is preferable that the battery housing package comprises (a) a battery housing chamber that houses the assembled battery, in which a cooling passage is formed and (b) a discharge chamber into which a discharge medium is discharged from the cell; and the discharge chamber is provided next to both sides of the battery housing chamber and is isolated from the battery housing chamber by each of side walls of the battery housing chamber that sandwich the cells from a positive side the cells and a negative side of the cells.

According to a ninth aspect of the present invention, the battery module according to the eighth aspect may further comprise: a connection conductor for electrically connecting the cells, wherein: electrodes of each of the cells expose to the discharge chamber from both of the side walls of the battery housing chamber; and the assembled battery is constituted with the cells electrically connected with one another by welding the connection conductor to electrodes of two different cells which expose from either one of the side walls of the battery housing chamber to the discharge chamber so as to electrically connect between the electrodes of the two different cells.

A battery module according to a tenth aspect comprises: a cell string comprising a plurality of cells, with at least two cell strings stacked one on top of another; a casing in which the cell strings are held and that comprises an inlet of a cooling air on one end thereof and an outlet of the cooling air on another end thereof, wherein: the casing comprises an inlet passage that extends from the inlet in a direction from the one end of the casing to the other end and an outlet passage that extends to the outlet in a direction from the one end of the casing to the other end, with the inlet passage and the outlet passage disposed offset from each other in a height direction of the casing; a height h1 and a height h2 are equal to each other, where the height h1 represents a height of the inlet passage which corresponds to a distance in the height direction between a one surface of the casing and a region closer to the one surface of the casing of cells arranged along the inlet passage, and the height h2 represents a height of the outlet passage which corresponds to a distance in the height direction between another surface of the casing and a region closer to the other surface of the casing of cells arranged along the outlet passage; a gap $\delta 1$ and a gap $\delta 2$ are substantially equal to each other in width, where the gap $\delta 1$ denotes a minimum gap between cells next to each other in an arrangement direction of cells of each of the cell strings, and the gap $\delta 2$ denotes a minimum gap between a one end of the casing and a cell arranged closest to the inlet side of each of the cell strings and a minimum gap between another end of the casing and a cell arranged closest to the outlet side of each of the cell strings; a cell arranged most upstream of a flow of the cooling air introduced into the casing through the inlet divides a mainstream of the cooling air into a plurality of substreams; and the cell strings are cooled by the cooling air passing through the inlet passage, the outlet passage, the gap $\delta 1$, and the gap $\delta 2$.

According to a eleventh aspect of the present invention, in the battery module according to the tenth aspect, it is preferable that the height h1 is at least 0.25 times and at most 0.5 times as a diameter of the cell.

A battery module according to a twelfth aspect of the present invention comprises: a cell string comprising a plurality of cells, with at least two cell strings stacked one on top of another; a casing in which the cell strings are held and that comprises an inlet of a cooling air on one end thereof and an outlet of the cooling air on another end thereof, wherein: the casing comprises an inlet passage that extends from the inlet in a direction from the one end of the casing to the other end and an outlet passage that extends to the outlet in a direction from the one end of the casing to the other end, with the inlet passage and the outlet passage disposed offset from each other in a height direction of the casing; a height h1 is smaller than a height h2, where the height h1 represents a height of the inlet passage which corresponds to a distance in the height direction between a one surface of the casing and a region closer to the one surface of the casing of cells arranged along the inlet passage, and the height h2 represents a height of the outlet passage which corresponds to a distance in the height direction between another surface of the casing and a region closer to the other surface of the casing of cells arranged along the outlet passage; a gap $\delta 1$ and a gap $\delta 2$ are substantially equal to each other in width, where the gap $\delta 1$ denotes a minimum gap between cells next to each other in an arrangement direction of cells of each of the cell strings, and the gap $\delta 2$ denotes a minimum gap between a one end of the casing and a cell arranged closest to the inlet side of each of the cell strings and a minimum gap between another end of the casing and a cell arranged closest to the outlet side of each of the cell strings; a cell arranged most upstream of a flow of the cooling air introduced into the casing through the inlet divides a mainstream of the cooling air into a plurality of substreams; and the cell strings are cooled by the cooling air passing through the inlet passage, the outlet passage, the gap $\delta 1$, and the gap $\delta 2$.

According to a thirteenth aspect of the present invention, in the battery module according to the twelfth aspect, it is preferable that the gap $\delta 1$ is at least 0.03 times as large as a diameter of the cell; and the height h1 is at least 0.25 times and at most 0.5 times as the diameter of the cell.

According to a fourteenth aspect of the present invention, in the battery module according to the tenth aspect, it is preferable that cells facing the outlet passage are provided with a thermal insulator.

According to a fifteenth aspect of the present invention, in the battery module according to the tenth aspect, it is preferable that at least three of the cell strings are stacked one on top of another.

According to a sixteenth aspect of the present invention, the battery module according to the tenth aspect may further comprises: a pair of electric insulators that sandwich the cell strings, wherein: a busbar for electrically connecting the cells is embedded in the electric insulators; and the busbar is welded to the cells.

According to a seventeenth aspect of the present invention, the battery module according to the tenth aspect may further comprises: at least two battery blocks arranged in parallel, with each of the battery blocks having a structure in which the cell strings are held in the casing.

A battery module according to a eighteenth aspect of the present invention comprises: a casing that comprises an inlet of a cooling air on one end thereof and an outlet of the cooling air on another end thereof; and a cell group that is held in the casing and that comprises a plurality of cell strings in which a plurality of cells are arranged from one end side to another end side of the casing, with the cell strings stacked one on top of another, wherein: the casing comprises an inlet passage that extends from the inlet in a direction from the one end of the casing to the other end and an outlet passage that extends to the outlet in the direction from one end of the casing to the other end, with the inlet passage and the outlet passage disposed offset from each other in a height direction of the casing; and a height h1 gradually becomes smaller from one end side of the casing toward the other end side of the casing while a height h2 gradually becomes larger from one end side of the casing toward the other end side of the casing, where the height h1 represents a height of the inlet passage which corresponds to a distance in the height direction between a one surface of the casing and a region closer to the one surface of the casing of cells arranged along the inlet passage, and the height h2 represents a height of the outlet passage which corresponds to a distance in the height direction between another surface of the casing and a region closer to the other surface of the casing of cells arranged along the outlet passage.

According to a nineteenth aspect of the present invention, in the battery module according to the seventeenth aspect, it is preferable that a cell arranged most upstream of a flow of the cooling air introduced into the casing through the inlet divides a mainstream of the cooling air into a plurality of substreams.

According to a twentieth aspect of the present invention, in the battery module according to the eighteenth aspect, it is preferable that a thickness of the casing in a region facing the inlet passage becomes larger from one end side of the casing toward the other end side; and a thickness of the casing in a region facing the outlet passage becomes smaller from one end side of the casing toward the other end side.

An electric storage device according to a twenty first aspect of the present invention comprises: the battery module according to the first aspect, that comprises the cells electrically connected with one another in series; and a battery control device that controls a state of each of the cells and notifies a higher-rank control device of the state of each the cells.

An electric system according to a twenty second aspect of the present invention comprises: an electric machine that generates a drive power by an electric power; an electric power conversion device that is electrically connected to the electric machine so as to control the electric power to be supplied to the electric machine; and an electric storage device that is electrically connected to the electric power conversion device so as to supply the electrical power to the electric power conversion device as a power source for the electric machine, wherein: the electric storage device comprises a battery module that comprises a plurality of cells electrically connected with one another in series and that is electrically connected to the electric power conversion device, and a battery control device that controls a state of each of the cells and notifies a controller of the electric power conversion device of the state of each of the cells; and the battery module is the battery module according to the first aspect.

DESCRIPTION OF PREFERRED EMBODIMENTS

Figure 1:
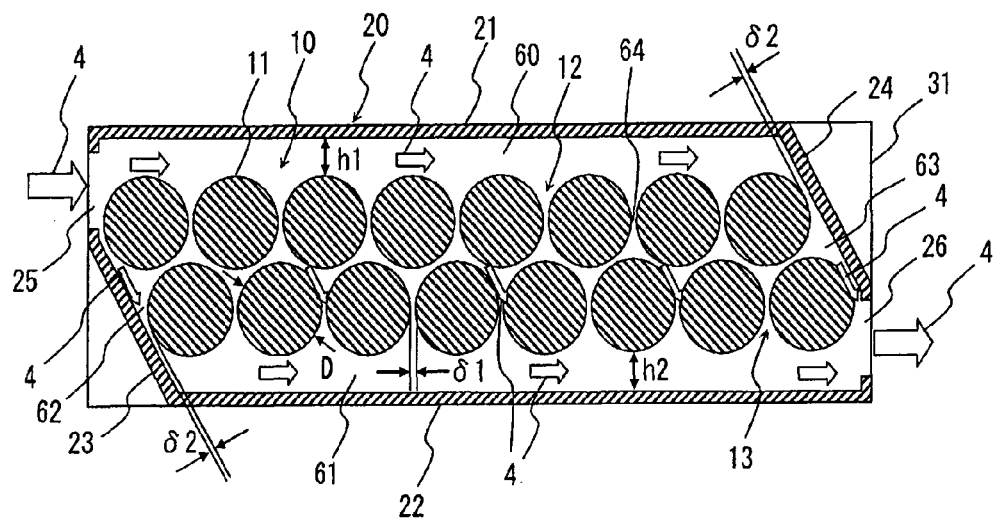
FIG. 1 is a cross-sectional view of an electric storage device of a first embodiment of the present invention, showing the configuration of a battery block that constitutes a battery module.

Embodiments of the present invention will now be explained with reference to the drawings. In the embodiments explained below, an example of the present invention applied to an electric storage device that constitutes an in-vehicle battery for a vehicle, particularly a small vehicle, will be explained.

As an example of the small vehicle, a hybrid electric vehicle, which includes an internal-combustion engine and an electric motor as driving sources of the vehicle, will be explained. However, the present invention may be applied to an electric vehicle, which includes an electric motor as a only drive source of the vehicle.

The configuration in the embodiments explained below may be applied to an electric storage device that constitutes another power source such as a power source for a rail vehicle, a power source for a large vehicle as a bus or a truck, a power source for an industrial vehicle as a battery forklift truck, a back-up power source for a computer system, and a power source for a private electric power facility. Applying the configuration in the embodiments explained below to the electric storage device that frequently repeats charge and discharge is preferable for improvement of battery performance.

First Embodiment

A first embodiment of the present invention will now be explained with reference to FIGS. 1 through 8. Firstly, the configuration of an in-vehicle electric system (an electric machine drive system) will be explained with reference to FIG. 6.

In an operating mode where rotative power is necessary, such as during the power running of the vehicle or at the internal-combustion engine starting, the in-vehicle electric system of the present embodiment drives a motor generator 200, which is a three-phase AC (alternate-current) synchronous motor, as a motor, and supplies driven bodies such as wheels and the engine with the generated rotative power. For this purpose, the in-vehicle electric system of the present embodiment outputs DC (direct-current) power from an electric storage device 100, which is an in-vehicle power source, converts the DC power to three-phase AC power by an inverter device 300, which is an electric power conversion device, and supplies the motor generator 200 with the converted three-phase AC power.

In an operating mode where electric power generation is necessary, such as when energy is to be regenerated by decelerating and braking the vehicle and when the stored charge of the electric storage device 100 is lacking, the in-vehicle electric system of the present embodiment drives the motor generator 200 as a generator with driving force from the wheels or the engine, and stores the generated three-phase AC power into the electric storage device 100. In particular, the in-vehicle electric system of the present embodiment converts the three-phase AC power which has been output from the motor generator 200 to DC power by the inverter device 300, and supplies the electric storage device 100 with the converted DC power.

The motor generator 200 is an electric machine that operates by the magnet action of an armature (stator) and a rotatably-held field (rotor) arranged internally opposite to the armature. An axis of rotation of the field is mechanically-connected to an axis of rotation of the driven bodies such as the wheels and the engine so as to transmit the rotative power between the motor generator 200 and the driven bodies.

The armature is a part that generates a rotating magnetic field upon receiving three-phase AC power when the motor generator 200 is driven as a motor and generates three-phase AC power by magnetic flux linkage when the motor generator 200 is driven as a generator. The armature includes an armature core (stator core), which is a magnetic material, and three-phase armature coils (stator coil) wound in the armature core.

The field is a part that generates field flux when the motor generator 200 is driven as a motor or a generator. The field includes a field core (rotor core), which is a magnetic material, and a permanent magnet and/or a field coil (rotor coil) provided at the field core. The field coil generates magnetic flux upon excitation by receiving field current supplied from an external power source.

The inverter device 300 is an electronic device for controlling the power conversion (converting the DC power to the three-phase AC power or converting the three-phase AC power to the DC power) by an ON/OFF operation of a switching semiconductor device. The inverter device 300 includes a power module 310, a driver circuit 320, and a motor controller 330.

The power module 310 is a conversion section that includes a converter circuit constituted by six switching semiconductor devices and performs the power conversion by the ON/OFF operation of the six switching semiconductor devices. MOSFETs (metal-oxide semiconductor field-effect transistors) or IGBTs (insulated gate bipolar transistors) are used for the switching semiconductor devices. The converter circuit is constituted by a three-phase bridge circuit in which series circuits for three phases are electrically connected in parallel, wherein each of the series circuits includes two (upper arm and lower arm for one phase) switching semiconductor devices that are electrically connected in series.

Each upper arm is electrically connected to a lower arm at one side and to a DC positive-side module terminal at the other side. Each lower arm is electrically connected to an upper arm at one side and to a DC negative-side module terminal at the other side. A midpoint of each arm, i.e., the connecting point of the upper arm and that of the lower arm, is electrically connected to an AC-side module terminal. The DC positive-side module terminal and the DC negative-side module terminal are electrically connected to a DC positive-side external terminal and a DC negative-side external terminal, respectively. The DC positive-side external terminal and the DC negative-side external terminal are terminals on the power source side used for transmitting DC power between the power module 310 and the electric storage device 100, and are electrically connected with the electric storage device 100 through a power cable 150. The AC-side module terminals are electrically connected to AC-side external terminals. The AC-side external terminals are terminals on the load side used for transmitting the three-phase AC power between the power module 310 and the motor generator 200, and are electrically connected with the motor generator 200 through load cables.

A smoothing capacitor 340 is electrically connected in parallel between the DC positive-side and the DC negative-side of the converter circuit. The smoothing capacitor 340 is provided so as to reduce voltage variation due to high-speed switching (ON/OFF) operations of the switching semiconductor devices that constitute the converter circuit and parasitic inductance in the converter circuit. A chemical capacitor (or electrolytic capacitor) or a film capacitor is used for the smoothing capacitor 340.

The motor controller 330 controls the switching operation of the six switching semiconductor devices that constitute the converter circuit. The motor controller 330 generates command signals (for example, PWM (pulse-width modulation) signal) for the six switching semiconductor devices based on a torque command which has been output from a higher-rank controller, e.g., a vehicle controller 400, which controls the entire vehicle, and outputs the generated command signals to the driver circuit 320. Based on the command signals which have been output from the motor controller 330, the driver circuit 320 generates drive signals for the six switching semiconductor devices, and outputs the generated drive signals to gate electrodes of the six switching semiconductor devices. Based on the drive signals which have been output from the driver circuit 320, the six switching semiconductor devices perform the ON/OFF operation.

The electric storage device 100 includes a battery module 110 for storing and releasing electrical energy so as to charge and discharge DC power, and a control device for managing and controlling the state of the battery module 110.

The battery module 110 is constituted by two battery blocks or battery packs, i.e., a higher potential battery block 110a and a lower potential battery block 110b, which are electrically connected in series. The battery blocks each house an assembled battery therein. The assembled battery is constituted by a plurality of lithium-ion cells electrically connected in series. There is a serviced is connect (SD) switch 110c provided between the negative-side (low-potential-side) of the higher potential battery block 110a and the positive-side (high-potential-side) of the lower potential battery block 110b. The SD switch 110c, which is a safety device provided for ensuring the safety at the maintenance of the electric storage device 100, is constituted by an electrical circuit in which a switch and a fuse are electrically connected in series.

The control device is constituted by a battery controller 130, which is a higher-rank (parent) controller, and a cell controller 120, which is a lower (child) controller.

The battery controller 130 manages and controls the state of the battery module 110, as well as notifies higher-rank control devices of the state of the battery module 110. The batter controller 130 performs as the management and control of the battery module 110, measurements of voltage, current, temperature, etc. of the battery module 110, calculations of SOC (state of charge), SOH (state of health), etc. of the battery module 110, and output of command to the cell controller 120. The higher-rank control devices include the vehicle controller 400 that controls the entire vehicle and the motor controller 330 that controls the inverter device 300.

The cell controller 120, which is constituted by a plurality of ICs (integrated circuits), manages and controls the state of the plurality of lithium-ion cells in response to the command from the battery controller 130. The management and control of the plurality of lithium-ion cells include measurement of voltage of each of the lithium-ion cells and adjustment of stored charge of each of the lithium-ion cells. Each of the ICs is connected with a group of lithium-ion cells so as to manage and control the state of the group of lithium-ion cells connected thereto.

A battery for auxiliaries which is mounted as a power supply for in-vehicle auxiliaries, e.g., lights and audio equipment, is used for a power source of the battery controller 130. The battery for auxiliaries mounted in automobiles is generally a battery with a nominal output voltage of 12V. Therefore, the battery controller 130 is applied with voltage (for example, 12V) from the battery for auxiliaries. The battery controller 130 steps down the applied voltage (for example, to 5V) through a power supply circuit constituted by a DC/DC converter, and applies the stepped-down voltage to electronic components that constitute the battery controller 130 as a driving voltage. This causes the electronic components that constitute the battery controller 130 to operate.

The plurality of lithium-ion cells corresponding to the ICs that constitute the cell controller 120 are used for the power supply of the ICs. For this reason, the cell controller 120 and the battery module 110 are electrically connected through a connect line 110d. The ICs are each applied with voltage at the maximum potential of the corresponding lithium-ion cells through the connect line 110d. The ICs each step down the applied voltage (for example, to 5V) through the power supply circuit so as to use the stepped-down voltage as an operation power source.

The battery controller 130 receives a signal which has been sent from an ignition key switch. The signal which has been sent from the ignition key switch serves as commands for start-up and for stop of the electric storage device 100.

When the ignition key switch is ON, in the battery controller 130 the power supply circuit operates upon an output signal from the ignition key switch so as to apply the driving voltage from the power supply circuit to a plurality of electronic circuit components. Accordingly, the plurality of electronic circuit components operate so as to start up the battery controller 130. When the battery controller 130 starts up, a start-up command is output from the battery controller 130 to the cell controller 120. In the cell controller 120, based on the start-up command, the power supply circuits of the plurality of ICs operate in order. This causes the plurality of ICs to start up in series and the cell controller 120 starts up. When the cell controller 120 starts up, predetermined initial processing is performed, completing the startup of the electric storage device 100.

The predetermined initial processing includes measurement of voltage of each of the lithium-ion cells, abnormality diagnosis, measurements of voltage, current, and temperature of the entire battery module 110, calculations of state of charge and state of health, and the like.

When the ignition key switch is OFF, a stop command is output from the battery controller 130 to the cell controller 120. When the cell controller 120 receives the stop command, predetermined termination processing is performed so that the power supply circuits of the ICs are each turned OFF, causing the cell controller 120 to stop. After the cell controller 120 is turned off, when communication is disconnected between the battery controller 130 and the cell controller 120, in the battery controller 130 the operation of the power supply circuits ends, and the operation of the plurality of electronic circuit components stops. This causes the battery controller 130 to stop, thereby causing the electric storage device 100 to be turned off.

The predetermined termination processing includes measurement of the voltage of each of the lithium-ion cells and adjustment of stored charge of each of the lithium-ion cells.

An in-vehicle local area network is used for communication between the battery controller 130 and higher-rank controllers such as the vehicle controller 400 and the motor controller 330. LIN (Local Interconnect Network) is used for communication between the battery controller 130 and the cell controller 120.

Positive and negative terminals of the battery module 110 and the DC positive and negative-side external terminals of the inverter device 300 are electrically connected through the power cable 150. Specifically, the positive terminal of the higher potential battery block 110a and the DC positive-side external terminal of the inverter device 300 are electrically connected through the positive-side power cable 150P, while the negative terminal of the lower potential battery block 110b and the DC negative-side external terminal of the inverter device 300 are electrically connected through the negative-side power cable 150N.

There is a junction box provided in the middle of the power cable 150. A main relay 141 and a precharge circuit 142 is provided in the junction box, which constitute a relay section 140. The relay section 140 is an ON/OFF unit for electrically conducting or blocking between the battery module 110 and the inverter device 300. At start-up of the in-vehicle electric system the relay section 140 electrically conducts between the battery module 110 and the inverter device 300, while at stopping or in case of abnormality of the in-vehicle electric system the relay section 140 electrically blocks between the battery module 110 and the inverter device 300. The electrical conduction and block between the electric storage device 100 and the inverter device 300 are thus controlled by the relay section 140, thereby assuring a high level of security of the in-vehicle electric system.

The electrical conduction and block of the relay section 140 are controlled by the command signal which has been output from the motor controller 330. At start-up of the in-vehicle electric system, upon receiving notification of completion of start-up of the electric storage device 100 from the battery controller 130, the motor controller 330 outputs a command signal for controlling the relay section part 140 to be electrically conductive. On the other hand, at stopping of the in-vehicle electric system or in case of abnormality of the in-vehicle electric system, upon receiving the OFF signal output from the ignition key switch, the motor controller 330 outputs a command signal for controlling the relay part 140 to be electrically blocked.

The main relay 141 includes a positive-side main relay 141P for electrical ON/OFF of the positive-side power cable 150P and a negative-side main relay 141N for electrical ON/OFF of the negative-side power cable 150N.

The precharge circuit 142 is a series circuit including a precharge relay 142a and a resistor 142b electrically connected in series, and is electrically connected in parallel to the positive-side main relay 141P.

At start-up of the in-vehicle electric system, firstly the negative side main relay 141N is turned ON and then the precharge relay 142a is turned ON. This allows the current from the electric storage device 100 to be limited by the resistor 142b and then supplied to the smoothing capacitor 340, thereby charging the smoothing capacitor 340. After the smoothing capacitor 340 is charged to a predetermined voltage, the positive side main relay 141P is turned ON, and the precharge relay 142a is opened. This allows the main current to be supplied from the electric storage device 100 to the inverter device 300 through the positive side main relay 141P, wherein the main current is less than allowable current of the positive side main relay 141P and the smoothing capacitor 340. Therefore, at start-up of the in-vehicle electric system, the smoothing capacitor 340 and the positive side main relay 141P can be protected from high current without having abnormality. For example, due to nearly zero charge of the smoothing capacitor 340 instantaneous high initial current flows from the electric storage device 100 into the inverter device 300, causing the smoothing capacitor 340 to generate high heat and be damaged due to the generated heat, a fixed contact and a movable contact of the positive side main relay 141P to be fused together, or the like.

The junction box houses a current sensor 143 therein. The current sensor 143 is provided so as to detect the current supplied from the electric storage device 100 to the inverter device 300. An output line from the current sensor 143 is connected to the battery controller 130. Based on a signal which has been output from the current sensor 143, the battery controller 130 detects the current supplied from the electric storage device 100 to the inverter device 300. The battery controller 130 notifies the higher-rank controllers such as the motor controller 330 and the vehicle controller 400 of the current detection information.

It should be noted that the junction box may house therein a voltage sensor that detects the voltage of the entire battery module 110. Also in this case, based on an output signal from the voltage sensor, the battery controller 130 detects the voltage of the entire battery module 110 and notifies the higher-rank controllers of the detection information. The current sensor 143 and the voltage sensor, may be disposed outside the junction box.

A positive-side capacitor 151P is electrically connected between the positive-side power cable 150P and a housing ground of the electric storage device 100 with the same potential as a vehicle chassis. A negative-side capacitor 151N is electrically connected between the negative-side power cable 150N and a housing ground of the electric storage device 100 with the same potential as a vehicle chassis. The positive-side capacitor 151P and the negative-side capacitor 151N are provided so as to remove noise generated by the inverter device 300, to prevent the battery controller 130 and the cell controller 120, which are light electrical circuits, from malfunctioning, and to prevent surge voltage from destroying the ICs constituting the cell controller 120. Even though the inverter device 300 includes a noise filter, the positive-side capacitor 151P and the negative-side capacitor 151N further increases the effectiveness in preventing the battery controller 130 and the cell controller 120 from malfunctioning, and in preventing the surge voltage from destroying the ICs constituting the cell controller 120, thereby further increasing reliability of the electric storage device 100 in terms of high tolerance for noise.

It should be noted that the in-vehicle electric system of the present embodiment uses the air existing in the vehicle interior as a cooling medium so as to cool the electric storage device 100 and the inverter device 300 in this particular order. For this reason, the electric storage device 100 and the inverter device 300 are housed in one and the same case, wherein cooling passages of each device are connected with each other through a duct. Drive of a fan that supplies the cooling medium into the case is controlled by the motor controller 330 or its higher-rank controller, i.e., the vehicle controller 400, while monitoring temperature of the battery module 110 and the power module 310. If the electric storage device 100 is separately disposed, the drive of the fan that feeds the cooling medium is controlled by the battery controller 130 while monitoring temperature of the battery module 110.

A configuration of the electric storage device 100 will now be explained with reference to FIGS. 1 to 4. The electric storage device 100 is constituted by two main units, the battery module 110 and a control device 160.

As mentioned above, the battery module 110 of the present embodiment is constituted by the two battery blocks (or battery packs), i.e., the higher potential battery block 110a and the lower potential battery block 110b, wherein the two blocks are electrically connected in series. The higher potential battery block 110a and the lower potential battery block 110b have the same hexahedron structure in which two sides facing each other in the longitudinal direction of the block are parallel oblique. The blocks 110 and 110b are juxtaposed on a module base 1 so as to lie next to each other in the transverse direction and fixed thereon using fixing means such as a screw. Moreover, the higher potential battery block 110a and the lower potential battery block 110b are connected with each other and fixed by a supporting member 2 on one ends in the longitudinal direction and by a supporting member 3 on the other ends. The supporting members 2 and 3 are metal plate-like members having high rigidity.

The higher potential battery block 110a includes a casing 20 (also referred to as a housing or a package) and an assembled battery 10 held in the casing 20. It is to be noted that the structure of the higher potential battery block 110a is explained below as a representative since the higher potential battery 110a and the lower potential battery 110b have the same construction as one another.

The casing 20, a hexahedron housing in which two sides facing each other in the longitudinal direction of the blocks are parallel oblique, is constituted by six members, i.e., an inlet passage forming plate 21, an outlet passage forming plate 22, an inlet-side guide plate 23, an outlet-side guide plate 24 and two side plates 30 and 31.

The inlet passage forming plate 21 and the outlet passage forming plate 22 are rectangular flat plates that form an upper surface of the casing 20 and a bottom surface of the casing 20, respectively. The inlet passage forming plate 21 and the outlet passage forming plate 22 are the same in size and are arranged so as to offset from each other in the longitudinal direction of the casing 20. The inlet passage forming plate 21 and the outlet passage forming plate 22 are made of a rigid thin metal plate.

The inlet-side guide plate 23 is an oblique flat plate that forms one side of the sides facing each other in the longitudinal direction of the casing 20 and runs obliquely from an end in the longitudinal direction of the outlet passage forming plate 22 to an end in the longitudinal direction of the inlet passage forming plate 21. The outlet-side guide plate 24 is a oblique flat plate that forms the other side of the sides facing each other in the longitudinal direction of the casing 20 and runs obliquely from the other end in the longitudinal direction of the inlet passage forming plate 21 to the other end in the longitudinal direction of the outlet passage forming plate 22. The inlet-side guide plate 23 and the outlet-side guide plate 24 are each made of a rigid thin metal plate.

The two side plates 30 and 31, which are flat plates that form two sides facing each other in the transverse direction of the casing 20, are moldings formed by molding plastic resin having electrical insulation. The side plates 30 and 31 are thicker than the inlet passage forming plate 21, the outlet passage forming plate 22, the inlet-side guide plate 23, or the outlet-side guide plate 24.

Between an end in the longitudinal direction of the inlet passage forming plate 21 and the end on the inlet passage forming plate 21 side of the inlet-side guide plate 23, a cooling medium inlet 25 is formed and a cooling medium inlet duct 40 is provided so as to guide cooling air, which is a cooling medium, to the cooling medium inlet 25. Between the other end in the longitudinal direction of the outlet passage forming plate 22 and the other end on the outlet passage forming plate 22 side of the outlet-side guide plate 24, a cooling medium outlet 26 is formed and a cooling medium outlet duct 41 is provided for discharging the cooling air from the cooling medium outlet 26. According to this configuration, the cooling medium inlet 25 and the cooling medium outlet 26 are arranged to offset from each other with respect to the direction in which the inlet passage forming plate 21 faces to the outlet passage forming plate 22.

Although the inlet passage forming plate 21, the outlet-side guide plate 24, and the cooling medium outlet duct 41 are integrally formed, they may be separately formed. Although the outlet passage forming plate 22, the inlet-side guide plate 23, and the cooling medium inlet duct 40 are integrally formed, they may be separately formed. The integral formation is preferable for assemblability of modules.

Figure 2:
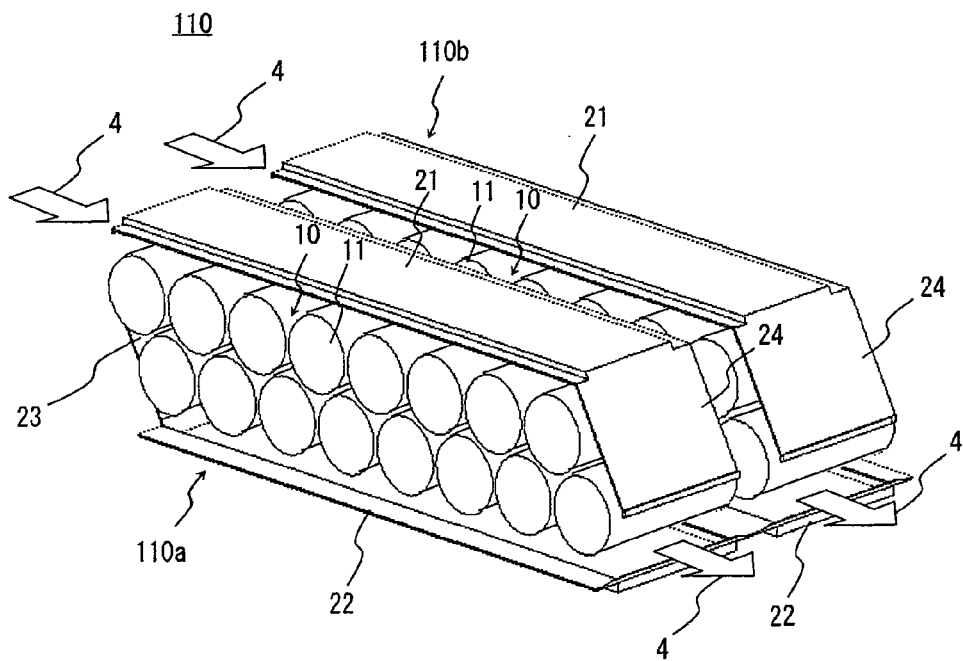
FIG. 2 is a perspective view of the electric storage device of the first embodiment of the present invention, showing the configuration of the battery blocks that constitute the battery module.
Figure 3:
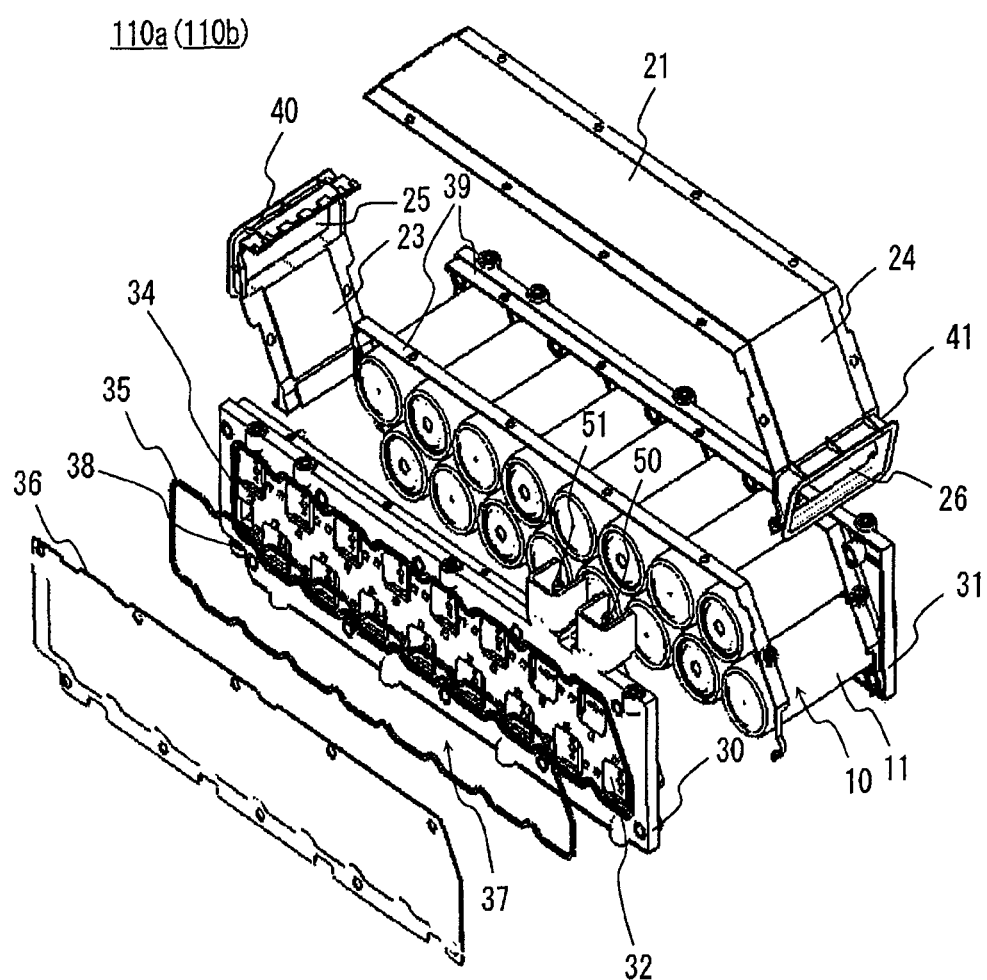
FIG. 3 is a partially exploded perspective view of the electric storage device of the first embodiment of the present invention, showing the configuration of the battery block that constitutes the battery module.
Figure 4:
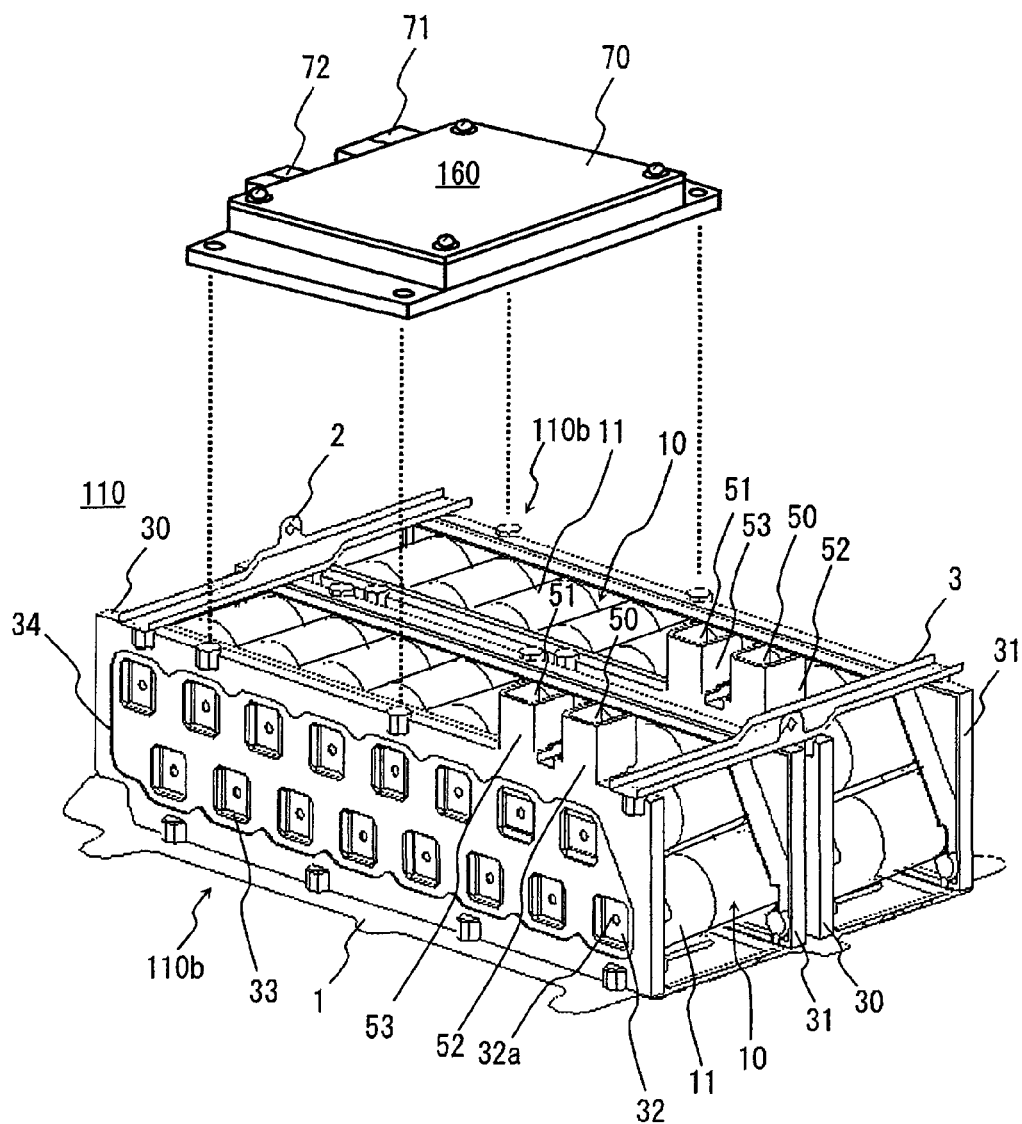
FIG. 4 is a partially exploded perspective view of the electric storage device of the first embodiment of the present invention, showing overall configuration of the electric storage device including a control device mounted on the battery module.

It should be noted that in the drawings some parts of the configurations are not shown for the sake of clarity. FIG. 1 omits the cooling medium inlet duct 40 and the cooling medium outlet duct 41. FIG. 2 omits the two side plates 30 and 31, the cooling medium inlet duct 40, and the cooling medium outlet duct 41. FIG. 3 omits the outlet passage forming plate 22. FIG. 4 omits the inlet passage forming plate 21, the outlet passage forming plate 22, the inlet-side guide plate 23, the outlet-side guide plate 24, the cooling medium inlet duct 40, and the cooling medium outlet duct 41.

As used in the above description, in the present embodiment, the longitudinal direction and the transverse direction of the casing 20 are defined in the following manner. The longitudinal direction of the casing 20 is defined as the longest direction or the direction from the cooling medium inlet 25 to the cooling medium outlet 26. The transverse direction of the casing 20 is defined as a direction in which two sides, i.e., the two side plates 30 and 31, face each other. The two side plates 30 and 31 form two side of the casing 20 which are different from another two sides, i.e., the inlet-side guide plate 23 and the outlet-side guide plate 24, facing each other in the longitudinal direction. The transverse direction may be defined as a direction of the central axis of a lithium-ion cell 11 in which two electrodes, i.e., positive and negative electrodes, face each other, or as a direction in which two connection units that electrically connect the plurality of lithium-ion cells 11 face each other. In addition, in the present embodiment, a height direction of the casing 20 is, regardless of the direction of installation of the battery module 110, defined as a direction in which the inlet passage forming plate 21 and the outlet passage forming plate 22 face each other, or as a direction in which the outlet passage forming plate 22, the lithium-ion cell 11, the cooling passage and the inlet passage forming plate 21 are placed on top of another. These definitions apply also in the description herein after.

The assembled battery 10 is a group of the plurality of lithium-ion cells 11 (cell group). The plurality of lithium-ion cells 11 lie aligned in order and housed in the casing 20, as well as sandwiched between the side plates 30 and 31 in the transverse direction, thereby being electrically connected in series by a plurality of connection conductors (busbars) 32.

The lithium-ion cell 11 is a cylindrical body in which components such as a cell element, electrolyte solution, and a safety valve are housed in the cell housing and sealed with a cell cap. The cell element is formed by rolling up a laminated body including four layers of a positive-electrode material, a separator which is an insulating material, a negative-electrode material, and a separator. The cell housing is a cylindrical metal body. The cell cap is a sealing member fixed to the open end of the cell housing and used to cover the open end after the components such as the cell element, the electrolyte solution, and the safety valve are housed in the cell housing. A positive electrode is formed in the cell cap. A negative electrode is formed on the close end of the cell housing, which is positioned in the other side to the open end. The safety valve is a gas release valve that is opened when the internal pressure of the cell housing is high so as to discharge a medium or gas generated inside the cell housing to outside. The lithium-ion cell 11 has the output voltage of 3.0~4.2V, with the average of 3.6V.

In the present embodiment, sixteen of the lithium-ion cells 11 are aligned in order and housed in the casing 20 so as to constitute the assembled battery 10. Specifically, with the sixteen lithium-ion cells 11 lying on their side so that the central axes thereof extend in the transverse direction, each of first and second cell strings 12 and 13 is constituted with eight lithium-ion cells 11 arranged along the longitudinal direction with their central axes in parallel. The first and the second cell strings 12 and 13 are stacked on top of another in the height direction. The first and second cell strings 12 and 13 may be placed on top of another such that the central axis of any one cell in the cell string 12 and that of the cell just thereunder in the cell string 13 are in the same vertical line, or such that the midpoint of a line segment between central axes of any two cells lying next to each other in the cell string 12 and the central axis of the cell thereunder in the cell string 13 are in the same vertical line. Thus, in the present embodiment, the assembled battery 10 is formed with eight lithium-ion cells 11 arranged along the longitudinal direction and two groups of the eight cells stacked on top of another in the height direction.

The first cell string 12 is arranged closer to the inlet passage forming plate 21 than the second cell string 13 is, and is arranged obliquely to the inlet passage forming plate 21 than the second cell string 13 is. The second cell string 13 is arranged closer to the outlet passage forming plate 22 than the first cell string 12 is, and is arranged deviated to the cooling medium outlet 26 than the first cell string 12 is. In the present embodiment, for example, the first cell string 12 and the second cell string 13 are arranged offset from one another in the longitudinal direction so that, in the longitudinal direction, the position of the central axis of the lithium-ion cell 11 disposed closest to the cooling medium outlet 26 in the first cell string 12 lies at the midpoint between the central axis of the lithium-ion cell 11 disposed closest to the cooling medium outlet 26 in the second cell string 13 and that of the lithium-ion cell 11 lying next thereto.

As described above, according to the present embodiment, since the first cell string 12 and the second cell string 13 are arranged obliquely in the longitudinal direction, the height of the assembled battery 10 can be reduced, enabling the higher potential battery block 110a to be downsized in the height direction.

An inlet-side passage 60 is formed in a space or gap between the inlet passage forming plate 21 and the first cell string 12. An outlet-side passage 61 is formed in a space or gap between the outlet passage forming plate 22 and the second cell string 13. Certain gaps are each formed between the first cell string 12 and the second cell string 13, between the lithium-ion cells 11 arranged in the longitudinal direction of the first cell string 12, and between the lithium-ion cells 11 arranged in the longitudinal direction of the second cell string 13. Accordingly, an inter-cell passage 64 is formed between the lithium-ion cells 11. An inlet-side guide passage 62 is formed in a space or gap between the lithium-ion cells 11 disposed closest to the cooling medium inlet 25 in each of the first cell string 12 and the second cell string 13 and the inlet-side guide plate 23. An outlet-side guide passage 63 is formed in a space or gap between the lithium-ion cells 11 disposed closest to the cooling medium outlet 26 in each of the first cell string 12 and the second cell string 13 and the outlet-side guide plate 24. The inlet-side passage 60, the outlet-side passage 61, the inter-cell passage 64, the inlet-side guide passage 62, and the outlet-side guide passage 63 are in communication with each other. The areas of the spaces or gaps are different from each other.

The inlet-side passage 60 is a distribution passage through which a cooling medium 4 flowing into the casing 20 through the cooling medium inlet 25 is guided to the inter-cell passage 64 and the outlet-side guide passage 63. The inlet-side passage 60 linearly extends in the longitudinal direction from the cooling medium inlet 25 to the cooling medium outlet 26 along the first cell string 12 and the inlet passage forming plate 21.

The outlet-side passage 61 is an aggregate passage through which the cooling medium 4 passing through the inlet-side guide passage 62 and the inter-cell passage 64 is guided to the cooling medium outlet 26. The outlet-side passage 61 linearly extends in the longitudinal direction from the cooling medium inlet 25 to the cooling medium outlet 26 along the outlet passage forming plate 22 and the second cell string 13.

The inlet-side passage 60 and the outlet-side passage 61 are arranged in parallel with layers of the lithium-ion cells 11 stacked on top of another in the height direction so as to sandwich the assembled battery 10 from a top and a bottom in the height direction. Thus, the inlet-side passage 60, the outlet-side passage 61, and the assembled battery 10 are in a hierarchical structure in the height direction from the outlet passage forming plate 22 toward the inlet passage forming plate 21 in the order of the outlet-side passage 61, the second cell string 13, the first cell string 12, and the inlet-side passage 60.

The inter-cell passage 64 is an internal passage that extending throughout the assembled battery 10 as a mesh so that the cooling medium 4 guided by the inlet-side passage 60 and the inlet-side guide passage 62 is distributed throughout the assembled battery 10.

The inlet-side guide passage 62 is a passage through which the cooling medium 4 flowing in the casing 20 through the cooling medium inlet 25 is guided to the outlet-side passage 61 so that the cooling medium 4 flows between the inlet-side guide plate 23 and the lithium-ion cells 11 disposed closest to the cooling medium inlet 25 in each of the first cell string 12 and the second cell string 13. The inlet-side guide passage 62 extends along the lithium-ion cells 11 disposed closest to the cooling medium inlet 25 in each of the first cell string 12 and the second cell string 13 and along the inlet-side guide plate 23 obliquely from the cooling medium inlet 25 to the outlet-side passage 61.

The outlet-side guide passage 63 is a passage through which the cooling medium 4 guided by the inlet-side passage 60 is guided to the cooling medium outlet 26 so that the cooling medium 4 flows between the outlet-side guide plate 24 and the lithium-ion cells 11 disposed closest to the cooling medium outlet 26 in each of the first cell string 12 and the second cell string 13. The outlet-side guide passage 63 extends along the lithium-ion cells 11 disposed closest to the cooling medium outlet 26 in each of the first cell string 12 and the second cell string 13 and along the outlet-side guide plate 24 obliquely from the inlet-side passage 60 to the cooling medium outlet 26.

The inlet-side guide passage 62 and the outlet-side guide passage 63 are arranged in parallel with the lithium-ion cells 11 which are arranged at both ends in the longitudinal direction of the assembled battery 10 so as to sandwich the assembled battery 10 in the longitudinal direction. Thus, the inlet-side guide passage 62, the outlet-side guide passage 63, and the assembled battery 10 are in a row in the longitudinal direction from the inlet-side guide plate 23 toward the outlet-side guide plate 24 in the order of the inlet-side guide passage 62, the plurality of lithium-ion cells 11, and the outlet-side guide passage 63.

The cooling medium inlet 25 is formed on the longitudinal extension of the first cell string 12 and the inlet-side passage 60. The cooling medium outlet 26 is formed on the longitudinal extension of the second cell string 13 and the outlet-side passage 61. Therefore, the cooling medium inlet 25 and the cooling medium outlet 26 are arranged obliquely in the height direction. Given that the battery module 110 is installed with the inlet passage forming plate 21 side up and the outlet passage forming plate 22 side down in the height direction, the cooling medium inlet 25 is on a higher level than that on which the cooling medium outlet 26 is.

Given that the battery module 110 is installed with the inlet passage forming plate 21 side up and the outlet passage forming plate 22 side down in the height direction, the position of the central axis of the cooling medium inlet 25 in the height direction is on a higher level than that on which the central axis of the lithium-ion cell 11 disposed closest to the cooling medium inlet 25 in the first cell string 12 is, and is on a lower level than the top parts of the lithium-ion cells 11 constituting the first cell string 12 facing to the inlet-side passage 60 and closest to the inlet passage forming plate 21. The position in the height direction of the central axis of the cooling medium outlet 26 is on a lower level than that on which the central axis of the lithium-ion cell 11 disposed closest to the cooling medium outlet 26 of the second cell string 13 is, and is on a higher level than the bottom parts of the lithium-ion cells 11 constituting the second cell string 13 facing to the outlet-side passage 61 and closest to the outlet passage forming plate 22.

The lithium-ion cell 11 disposed closest to the cooling medium inlet 25 in the first cell string 12 serves as a cooling medium diverter mechanism that diverts the cooling medium 4 flowing in the casing 20 through the cooling medium inlet 25 into the cooling medium flowing through the inlet-side passage 60 and the cooling medium flowing through the inlet-side guide passage 62.

As explained above, according to the present embodiment, since the lithium-ion cell 11 serves as the cooling medium diverter mechanism, a separate diverter mechanism is not necessary for guiding the cooling medium 4 to the inlet-side guide passage 62 into which the cooling medium 4 is not easily flow without a diverter.

If the functions of the cooling medium inlet 25 and the cooling medium outlet 26 are reversed, i.e., a cooling medium is supplied through the cooling medium outlet 26, the lithium-ion cell 11 disposed closest to the cooling medium outlet 26 in the second cell string 13 serves as a cooling medium diverter mechanism. A similar diversion function is thus achieved even if inlet and outlet of the cooling medium is reversed so as to supply the cooling medium to the higher potential battery block 110a. This is achieved because the structure of the higher potential battery block 110a remains unchanged even if the battery block 110a is rotated by 180 degrees around the center of the cross-section in the transverse direction as shown in FIG. 1. In other words, the higher potential battery block 110a has a rotationally symmetric structure (or a reversible structure).

As described above, if the higher potential battery block 110a has a rotationally symmetric structure, the cooling medium supplied through the cooling medium inlet 25 and flowing in the higher potential battery block 110a and the cooling medium supplied through the cooling medium outlet 26 and flowing in the higher potential battery block 110a flow similarly to each other and their cooling efficiencies are similar to each other although their directions are different from each other. According to the present embodiment, the order of the cooling can be changed. That is, the cooling medium flows in order from the battery module 110 to the inverter device 300 and also flows in order from the inverter device 300 to the battery module 110. Therefore, according to the present embodiment, for example, when the battery module 110 is to be warmed up first, the cooling medium is supplied in order from the inverter device 300 to the battery module 110 so as to warm up the battery module 110 using a warmed cooling medium. On the other hand, when the battery module 110 is to be cooled, the cooling medium is supplied in order from the battery module 110 to the inverter device 300 so as to cool down the battery module 110 using a cooled cooling medium. Moreover, according to the present embodiment, the position in the height direction in which the cooling medium is supplied can be changed from the inlet passage forming plate 21 side to the outlet passage forming plate 22 side, and vice versa.

The flow of the cooling medium will now be explained. When a fan disposed in the cooling duct in the in-vehicle electric system is driven, the air existing in the vehicle interior is used as the cooling medium 4 so as to flow into the casing 20 through the cooling medium inlet duct 40 and the cooling medium inlet 25. After getting into the casing 20, the cooling medium 4 first runs into the lithium-ion cell 11 disposed closest to the cooling medium inlet 25 in the first cell string 12. This results in diverting the mainstream of the cooling medium 4 into the mainstream flowing through the inlet-side passage 60 and a substream flowing through the inlet-side guide passage 62, with a flow rate of the substream smaller than that of the mainstream.

The mainstream of the cooling medium flows from the cooling medium inlet 25 to the outlet-side guide passage 63 through the inlet-side passage 60, cooling the lithium-ion cells 11 constituting the first cell string 12 in the regions facing the inlet passage forming plate 21. The mainstream is distributed throughout the inter-cell passage 64 and the outlet-side guide passage 63, resulting in a plurality of distribution flows. The substream of the cooling medium flows obliquely from the cooling medium inlet 25 to the outlet-side passage 61 through the inlet-side guide passage 62, cooling the lithium-ion cell 11 disposed closest to the cooling medium inlet 25 in each of the first cell string 12 and the second cell string 13 in the regions facing the cooling medium inlet 25.

The distribution flows of the cooling medium, as shown by oblique arrows in FIG. 1, flow relatively obliquely from the inlet-side passage 60 to the outlet-side passage 61 throughout the inter-cell passage 64, cooling the outer peripheral surface of each of the lithium-ion cells 11. The distribution flows of the cooling medium flow obliquely from the inlet-side passage 60 to the cooling medium outlet 26 through the outlet-side guide passage 63, cooling the lithium-ion cell 11 disposed closest to the cooling medium outlet 26 in each of the first cell string 12 and the second cell string 13 in the regions facing the cooling medium outlet 26.

The aggregate flow of the cooling medium is formed by the substream of the cooling medium, which flows through the inlet-side guide passage 62, and the distribution flow of the cooling medium, which flows throughout the inter-cell passage 64, merging together. The aggregate flow goes from the inlet-side guide passage 62 to the cooling medium outlet 26 through the outlet-side passage 61, cooling the lithium-ion cells 11 constituting the second cell string 13 in the regions facing the outlet passage forming plate 22.

Now, in the present embodiment, the widths or the heights of the passages and the diameter of the lithium-ion cells are denoted henceforth as follows. $\delta 1$ denotes the width of the inter-cell passage 64, i.e., the smallest width of the gap between the lithium-ion cells 11 lying longitudinally next to each other (the arranging direction of the lithium-ion cells 11) in the first cell string 12 and the second cell string 13. $\delta 2$ denotes the width of the inlet-side guide passage 62, that is, the longitudinal gap between the inner wall surface of the inlet-side guide plate 23 and the closest regions to the cooling medium inlet 25 of the lithium-ion cells 11 disposed closest to the cooling medium inlet 25 in each of the first cell string 12 and the second cell string 13 and the width of the outlet-side guide passage 63, that is, the longitudinal gap between the inner wall surface of the outlet-side guide plate 24 and the closest regions to the cooling medium outlet 26 of the lithium-ion cells 11 disposed closest to the cooling medium outlet 26 in each of the first cell string 12 and the second cell string 13. h1 denotes the height of the inlet-side passage 60, that is, the gap in the height direction between the inner wall surface of the inlet passage forming plate 21 and the closest regions to the inlet passage forming plate 21 of the lithium-ion cells 11 constituting the first cell string 12. h2 denotes the height of the outlet-side passage 61, that is, the gap in the height direction between the inner wall surface of the outlet passage forming plate 22 and the closest regions to the outlet passage forming plate 22 of the lithium-ion cells 11 constituting the second cell string 13. D denotes the diameter of each of the lithium-ion cells 11.

The height h1 and the height h2 are the same in size. Each of the height h1 and the height h2 is larger than each of the gap $\delta 1$ and the gap $\delta 2$ in size, and is smaller than the diameter D in size. Specifically, each of the height h1 and the height h2 is 0.25~0.5 times as the diameter D in size.

To reduce the overall height of the battery module 110 for downsizing, the height h1 and the height h2 are preferably minimized as far as pressure loss in the higher potential battery block 110a is within the allowable range. However, from the point of view of heat transfer, if the height h1 and the height h2 are too small, turbulence effect of the cooling medium becomes so large that the heat exchange between the lithium-ion cells 11 and the cooling medium is stimulated, causing the temperature of the lithium-ion cells 11 disposed downstream of the cooling medium to be relatively higher. Therefore, the lithium-ion cells 11 can not be cooled uniformly. On the other hand, from the hydrodynamic point of view, if the height h1 and the height h2 are too small, pressure loss in the higher potential battery block 110a increases, thereby decreasing the cooling efficiency of the lithium-ion cells 11.

Figure 7:
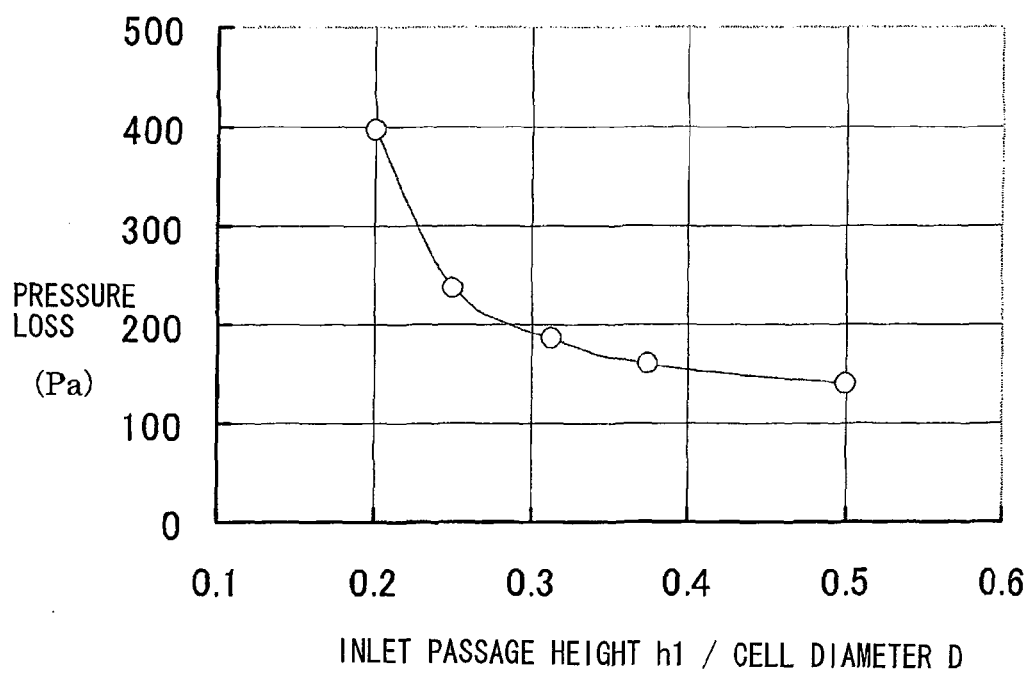
FIG. 7 is a characteristic diagram showing an analysis result of pressure loss to a ratio of a height of a cooling medium passage formed in the battery block to a diameter of the lithium-ion cell.

For the above reason, according to the analysis shown in FIG. 7 by the inventors of the present invention, the height h1 and the height h2 are determined based upon the diameter D as described above.

FIG. 7 is a characteristic diagram showing a two-dimensional analysis of the pressure loss (vertical axis) at the cooling medium inlet and outlet of the higher potential battery block 110a to the ratio (horizontal axis) of the height h1 to the diameter D, based upon a turbulence model using a Computational fluid dynamics (CFD) software.

In the analysis shown in FIG. 7, the average flow velocity of the cooling medium at the cooling medium inlet 25 is set to about 6 m/s which corresponds to the flow rate of the cooling medium of about 1 $m^3$/min using three-dimensional actual equipment. And the temperature of the cooling medium at the cooling medium inlet 25 is set to 40 degrees Celsius. The height h2 is set to the same as the height h1 in size.

As shown in FIG. 7, the pressure loss tends to steeply increase in the range where the ratio of the height h1 to the diameter D falls below 0.25. Also as shown in FIG. 7, the pressure loss moderately decreases as the ratio of the height h1 to the diameter D increases up to 0.5 and the pressure loss tends to moderately decrease in the range of the ratio exceeding 0.5. This is because the pressure loss in the inlet-side passage 60 and the outlet-side passage 61 is not dominant but the pressure loss in the inter-cell passage 64 is dominant.

Due to the above, in the present embodiment, the height h1 and the height h2 are set to be 0.25~0.5 times as the diameter D in size.

As described above, according to the present embodiment, since the inlet-side passage 60 and the outlet-side passage 61 are structurally optimized, the pressure loss in the cooling medium passage of the higher potential battery block 110a can be made lower and the stimulation of the turbulence effect of the cooling medium 4 is reduced, thereby reducing the temperature rise in the lithium-ion cells 11 disposed downstream of the cooling medium 4. According to the present embodiment, this results in better thermal contact between the cooling medium 4 and each of the lithium-ion cells 11, thereby reducing the temperature rise in each of the lithium-ion cells 11 due to charge and discharge and uniformly cooling the plurality of lithium-ion cells 11 so as to improve the cooling efficiency.

The gap $\delta 1$ and the gap $\delta 2$ are substantially the same in size, each of which is more than 0.03 times, preferably 0.03~0.07 times, as the diameter D in size.

Hydrodynamically, the gap $\delta 1$ and the gap $\delta 2$ have a function as a perforation in a perforated plate so as to achieve an effect of straightening the flow of the cooling medium 4. Consequently, the cooling medium 4 can be distributed at an uniform flow rate to the gap $\delta 1$ and the gap $\delta 2$ by appropriately setting dynamic pressure of the cooling medium 4 supplied form the cooling medium inlet 25 and the pressure loss generated in the gap $\delta 1$ and the gap $\delta 2$. It is preferable that the gap $\delta 1$ and the gap $\delta 2$ are nearly the same in size in order to distribute the cooling medium 4 to the gap $\delta 1$ and the gap $\delta 2$ at an uniform flow rate.

For the above reason, the gap $\delta 1$ and the gap $\delta 2$ are set to nearly the same in size. According to the analysis shown in FIG. 8 by the inventors of the present invention, the gap $\delta 1$ and the gap $\delta 2$ are determined based upon the diameter D as described above.

Figure 8:
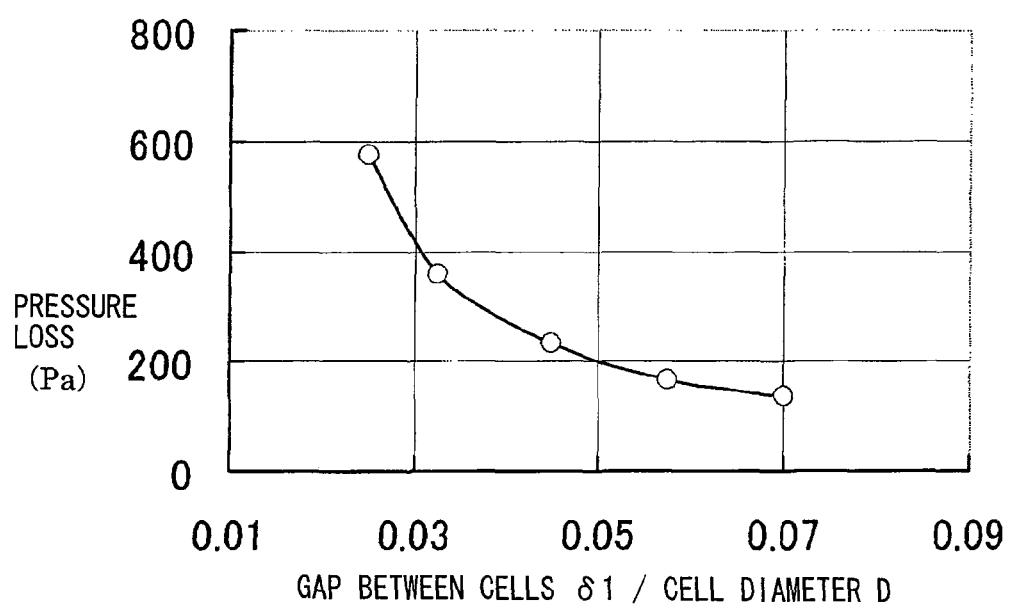
FIG. 8 is a characteristic diagram showing an analysis result of pressure loss to a ratio of a gap between lithium-ion cells in the battery block to the diameter of the lithium-ion cell.

FIG. 8 is a characteristic diagram showing a two-dimensional analysis of the pressure loss (vertical axis) at the cooling medium inlet and outlet of the higher potential battery block 110a to the ratio (horizontal axis) of the gap $\delta 1$ to the diameter D, based upon a turbulence model, the same model as in the analysis in FIG. 7, using a CFD software.

In the analysis shown in FIG. 8, as in FIG. 7, the average flow velocity of the cooling medium at the cooling medium inlet 25 is set to about 6 m/s which corresponds to the flow rate of the cooling medium of about 1 m$^3$/min using three-dimensional actual equipment. And the temperature of the cooling medium at the cooling medium inlet 25 is set to 40 degrees Celsius. Similarly, the height h2 is set to the same as the height h1 in size. In addition, the gap δ2 is set to nearly the same as the gap δ1 in size.

As shown in FIG. 8, the pressure loss tends to steeply increase in the range where the ratio of the gap δ1 to the diameter D falls below 0.03. This is because the pressure loss in the inter-cell passage 64 is dominant. Also as shown in FIG. 8, the pressure loss moderately decreases as the ratio of the gap δ1 to the diameter D increases up to 0.07 and the pressure loss tends to moderately decrease in the range of the ratio exceeding 0.07.

Due to the above, in the present embodiment, the gap δ1 and the gap δ2 are more than 0.03 times, preferably 0.03~0.07 times, as the diameter D in size.

As described above, according to the present embodiment, since the inter-cell passage 64, the inlet-side guide passage 62, and the outlet-side guide passage 63 are structurally optimized, the cooling medium 4 can be uniformly distributed to each of the inter-cell passage 64, the inlet-side guide passage 62, and the outlet-side guide passage 63. Therefore, according to the present embodiment, each of the lithium-ion cells 11 can be cooled by the cooling medium 4 at an uniform flow rate, thereby reducing the temperature rise of each of the lithium-ion cells 11.

Furthermore, according to the present embodiment, a cooling distance by the cooling medium 4 at an uniform flow rate can be reduced to as short as a distance corresponding to the diameters of two lithium-ion cells 11, that is, 2D. According to the present embodiment, this results in better heat transfer between the cooling medium of an uniform flow rate and each of the lithium-ion cells 11, thereby reducing the temperature rise of each of the lithium-ion cells 11 due to charge and discharge so as to improve the cooling efficiency.

According to the present embodiment described above, the following operational effects can be achieved.

(1) According to the present embodiment, since the thermal contact between the cooling medium 4 and each of the lithium-ion cells 11 can be improved and the cooling medium 4 can be distributed to each of the lithium-ion cells 11 at an uniform flow rate, temperature rise of each of the lithium-ion cells 11 due to charge and discharge can be reduced as well as equalizing temperature rise of each of the lithium-ion cells 11. This improves the cooling efficiency of the lithium-ion cells 11 and reduces variation in charge and discharge amount and lifetime of the lithium-ion cells 11.

(2) According to the present embodiment, since the cooling medium 4 is introduced in the casing 20 through the cooling medium inlet 25 and distributed throughout the plurality of lithium-ion cells 11, cooling difference between the lithium-ion cells 11 can be reduced.

(3) According to the present embodiment, since the temperature rise of each of the lithium-ion cells 11 can be equalized, temperature variation is reduced throughout the lithium-ion cells 11 from that disposed closest to the cooling medium inlet 25 to that disposed closest to the cooling medium outlet 26.

(4) According to the present embodiment, since the cooling medium 4, which has been introduced in the casing 20 through the cooling medium inlet 25, is diverted by the lithium-ion cell 11 disposed closest to the cooling medium inlet 25, the cooling medium 4 can be easily diverted and supplied to the inlet-side guide passage 62 without requiring a separate diverter mechanism.

(5) According to the present embodiment, by arranging the lithium-ion cells 11 so as to form the passages in the casing 20 and by determining the size of the passages based on the diameter D of the lithium-ion cell 11, the higher potential battery block 110a which achieves a sophisticated cooling can be configured relatively easily. In particular, with the higher potential battery block 110a, the thermal contact is improved between the cooling medium 4 and each of the lithium-ion cells 11 and the cooling medium 4 is distributed to each of the lithium-ion cells 11 at an uniform flow rate.

(6) According to the present embodiment, since the first cell string 12 and the second cell string 13 are arranged obliquely in the longitudinal direction, the assembled battery 10 can be made small in size in the height direction, resulting in the downsizing of the higher potential battery block 110a in the height direction. According to the present embodiment, this results in the downsizing of the battery module 110 in the height direction.

It is to be noted that the lower potential battery block 110b also achieves the same operational effects as the higher potential battery block 110a since the lower potential battery block 110b is configured in the same manner as the higher potential battery block 110b.

The configuration of the higher potential battery block 110a will be further explained. A seal member 39 is provided to joints between the inlet passage forming plate 21, the outlet passage forming plate 22, the inlet-side guide plate 23, and the outlet-side guide plate 24 and the side plates 30 and 31. The seal member 39 is a flat elastic member (for example, rubber) lying sandwiched between joint regions of the inlet passage forming plate 21, the outlet passage forming plate 22, the inlet-side guide plate 23, and the outlet-side guide plate 24 (ends of both of the transverse sides) and joint regions of the side plates 30 and 31 (flanges formed on the sides facing each other) along the joints between the inlet passage forming plate 21, the outlet passage forming plate 22, the inlet-side guide plate 23, and the outlet-side guide plate 24 and the side plates 30 and 31 so as to prevent the cooling medium 4 from leaking out through the joints between the inlet passage forming plate 21, the outlet passage forming plate 22, the inlet-side guide plate 23, and the outlet-side guide plate 24 and the side plates 30 and 31.

The connection conductor 32 is a copper conductive material that electrically connects between two lithium-ion cells 11 lying next to each other by being welded to a positive electrode of one of the two cells 11 and a negative electrode of the other of the two cells 11. The connection conductors 32 are embedded in the side plates 30 and 31 so as to expose the region welded to the lithium-ion cell 11 lying. In other words, the plurality of the connection conductors 32 are integrally molded to the side plates 30 and 31. Each of the weld regions of the connection conductors 32 to the lithium-ion cells 11 is formed as a surface projecting toward the lithium-ion cell 11 than other region which is molded in the side plate 30 or 31 is. A through-hole 32a that penetrates in the transverse direction is formed in the center of the weld region.

The side plates 30 and 31 are formed with a plurality of rectangular through-holes 33 that penetrate in the transverse direction on the walls thereof. The plurality of the through-holes 33 are provided in accordance with the arrangement of the plurality of lithium-ion cells 11 so as to correspond to the electrodes of the plurality of lithium-ion cells 11 arranged as above. The length of a side or width of each of the through-holes 33 is smaller than the diameter of the lithium-ion cell 11. At each of the through-holes 33, the protruded weld region of the connection conductor 32 for attaching with the lithium-ion cell 11 is disposed so as to substantially close the hole in the transverse direction. Due to this, most of the through-hole 33 is covered by the connection conductor 32 and a gap is formed in a part between the wall of the through-hole 33 and the connection conductor 32.

The plurality of lithium-ion cells 11 lie sandwiched between the side plates 30 and 31 so an electrode surface, that is, an end surface, of each cell toward the side plate 30 in the direction of the central axis covers the opening of each of the plurality of through-holes 33 on the side plate 31 from the side plate 31 side. Likewise, an electrode surface, that is, an end surface, of each cell towards the side plate 31 in the direction of the central axis covers the openings of each of the plurality of through-holes 33 on the side plate 31 from the side plate 30 side. The electrode surfaces on the side plate 30 side of the plurality of lithium-ion cells 11 are welded to the weld regions of the connection conductors 32 in the side plate 30, by spot welding from the side of the side plate 30 opposite to the side plate 31. The electrode surfaces on the side plate 31 side of the plurality of lithium-ion cells 11 are welded to the weld regions of the connection conductors 32 in the side plate 31, by spot welding from the side of the side plate 31 opposite to the side plate 30. By the welding, the plurality of lithium-ion cells 11 are electrically connected in series.

The side plate 30 is formed with a groove 34 on the wall facing opposite from the side plate 31 so as to encompass the openings of the plurality of through-holes 33 on the side plate 30. The side plate 31 is formed with a groove 34 on the wall facing opposite from the side plate 30 so as to encompass the openings of the plurality of through-holes 33 on the side plate 31. The groove 34 is fitted with an elastic circular seal member 35, e.g., a rubber seal member. An area inside of the groove 34 in the wall of the side plate 30 facing opposite from the side plate 31 and an area inside of the groove 34 in the wall of the side plate 31 facing opposite from the side plate 30 are uniformly recessed toward the lithium-ion cell 11.

The wall of the side plate 30 facing opposite from the side plate 31 and the wall of the side plate 31 facing opposite from the side plate 30 are each covered by a cover plate 36. The cover plate 36 is a flat metal member formed in the same shape as the side plates 30 and 31.

When the cover plate 36 is screwed to the side plate 30 so as to cover the recess of the wall of the side plate 30 facing opposite from the side plate 31 and the openings of the plurality of through-holes 33 on the side plate 30 are covered by the plurality of lithium-ion cells 11 from the side plate 31 side, a gas discharge chamber 37 is formed between the side plate 30 and the cover plate 36. When the cover plate 36 is screwed to the side plate 31 so as to cover the recess of the wall of the side plate 31 facing opposite from the side plate 30 and the openings of the plurality of through-holes 33 on the side plate 31 are covered by the plurality of lithium-ion cells 11 from the side plate 30 side, a gas discharge chamber 37 is formed between the side plate 31 and the cover plate 36.

The gas discharge chamber 37 is a chamber formed as described above so as to gather a discharge medium, such as electrolyte solution and gas generated in the cell housings, for example, in case of abnormality of the lithium-ion cells 11 or when internal pressure of the lithium-ion cells 11 becomes so high that the safety valve is opened. The discharge medium thus gathered is discharged through the gas discharge chamber 37. The gas discharge chamber 37 is disposed transversely next to the cooling passage formed in the casing 20 and separated in an airtight and liquid tight manner from the cooling passage formed in the casing 20. The airtightness and the liquid-tightness of the gas discharge chamber 37 are improved by the seal member 35 and a seal member (not figured) which is applied to between the lithium-ion cells 11 and the side plates 30 and 31.

The separation of the cooling passage formed in the casing 20 and the gas discharge chamber 37 prevents the discharge medium of the lithium-ion cells 11 from being discharged in the vehicle interior so as not to make the driver and passengers feel unpleasant. In addition, since the discharge medium from the lithium-ion cells 11 is disposed of to the outside through the gas discharge chamber 37, the safety of the battery module 110 is ensured.

The side plates 30 and 31 are each provided with a gas outlet 38 through which the discharge medium gathered in the gas discharge chamber 37 is discharged outside the battery module 110. The gas outlet 38 is connected with a gas outlet duct, e.g., a flexible hose (not figured), through which the discharge medium gathered in the gas discharge chamber 37 is guided to outside the battery module 110. The discharge medium gathered in the gas discharge chamber 37 is discharged outside the battery module 110 through the gas outlets 38 and the gas outlet ducts, thereby disposing properly.

The peripheral surface of the side plate 30 at one end in the height direction, that is, the inlet passage forming plate 21 side and at the other end in the longitudinal direction, that is, the cooling medium outlet 26 side is provided with a DC positive-side input/output terminal 50 electrically connected to the positive side of the assembled battery 10 and a DC negative-side input/output terminal 51 electrically connected to the negative side of the assembled battery 10 arranged lying next to each other in the longitudinal direction. The positive-side input/output terminal 50 is connected with a positive-side terminal of the power cable 150. The negative side input/output terminal 51 is connected with an end of the SD switch 110c. The positive-side terminal of the power cable 150 is connected to the negative-side input/output terminal of the lower potential battery block 110b. The other end of the SD switch 110c is connected to the positive-side input/output terminal of the lower potential battery block 110b.

The positive-side input/output terminal 50 and the negative-side input/output terminal 51 are each covered on three sides by cover members 52 and 53, respectively. The cover members 52 and 53 are moldings obtained by integrally molding with the side plate 30 using an electrically insulating resin, the material which the side plate 30 is made of. The cover member 52 and 53 are erected in the height direction on the peripheral surface of the side plate 30.

It should be noted that while the configuration of the higher potential battery module 110a is explained above, the configuration of the lower potential battery module 110b is the same as that of the higher potential battery module 110a. Therefore, components of the lower potential battery module 110b identical to that of the higher potential battery module 110a is attached with the common reference symbols and the explanation thereon is omitted.

Figure 5:
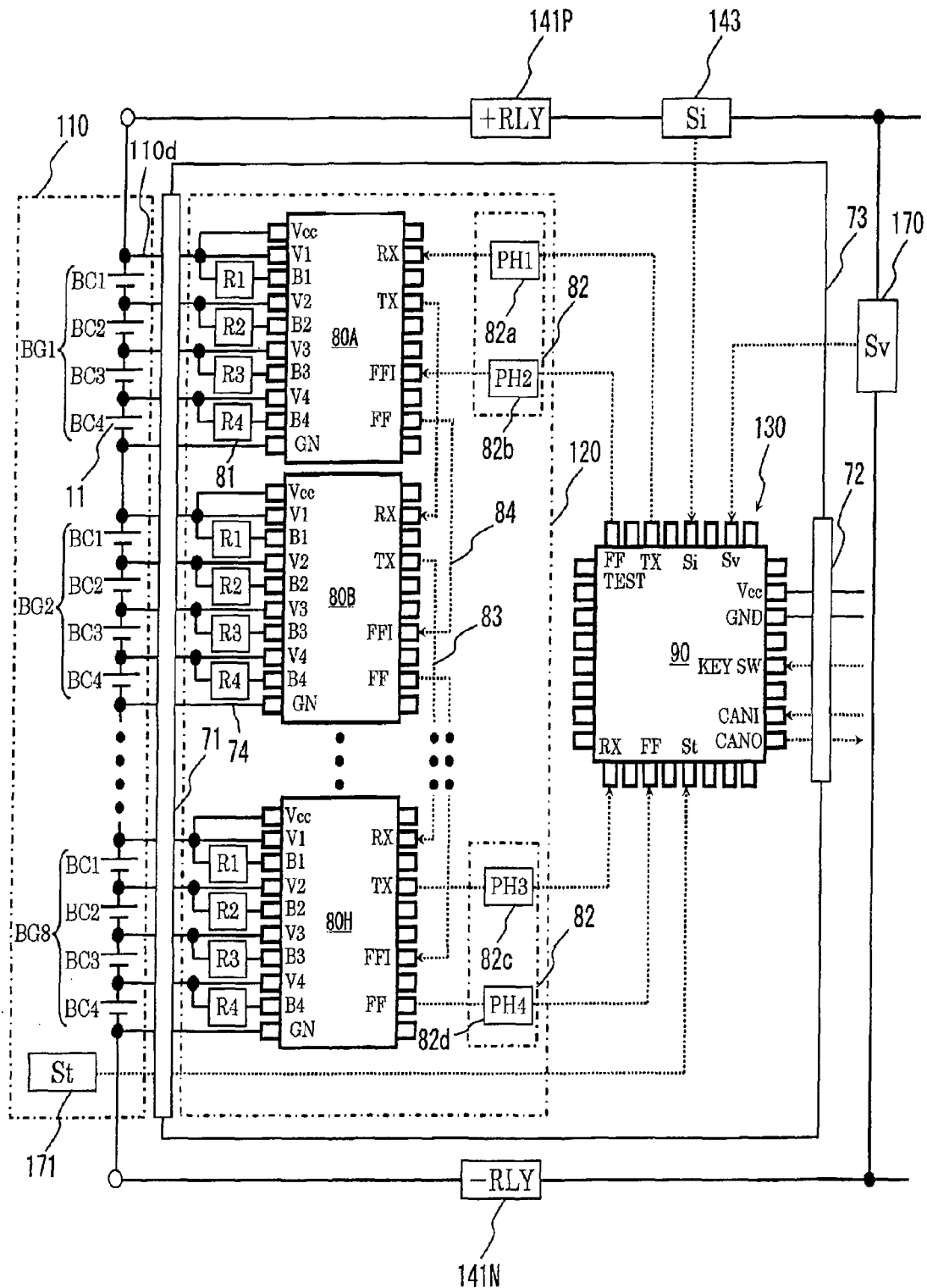
FIG. 5 is a circuit block diagram of an electrical circuit employed in the electric storage device of the first embodiment of the present invention.
Figure 6:
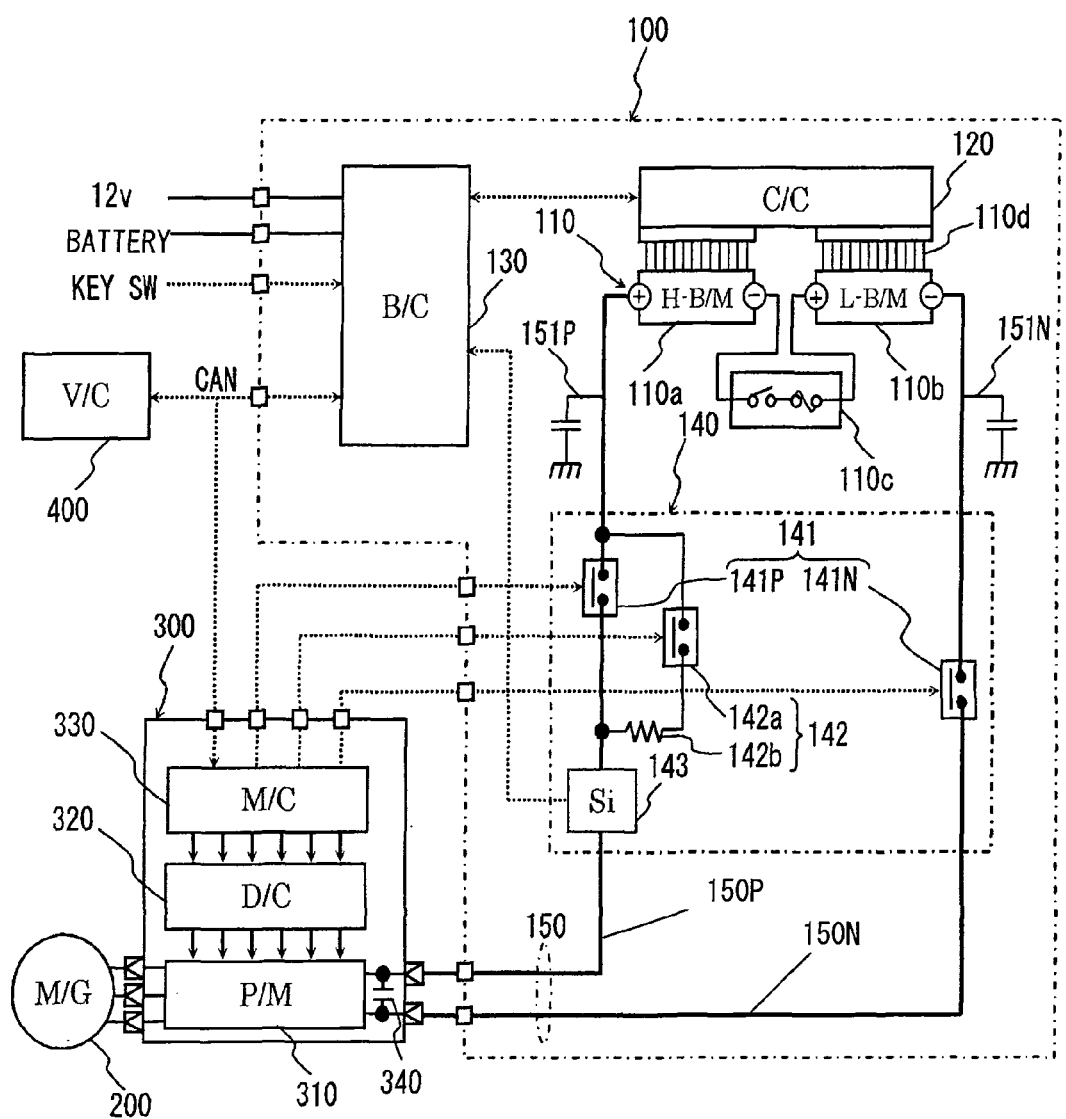
FIG. 6 is a block diagram of an electric system according to the first embodiment of the present invention.

The control device 160 will now be explained with reference to FIG. 5. The control device 160 is an electronic circuit device placed on the battery module 110, more specifically, placed across the higher potential battery module 110a and the lower potential battery module 110b, including a housing 70 and a circuit board 73 housed in the housing 70.

The housing 70 is a flat metal cuboid box screwed to the higher potential battery module 110a and the lower potential battery module 110b. This causes the higher potential battery module 110a and the lower potential battery module 110b to be connected and fixed to each other at their ends in the transverse direction by the control device 160. That is, in the present embodiment, since the control device 160 serves also as a support member, strength of the battery module 110 is improved.

The circuit board 73 is provided with electronic circuit components that constitute the cell controller 120 and an electronic circuit component that constitutes the battery controller 130. The electronic circuit components that constitute the cell controller 120 include six integrated circuits (IC) 80A~80H each electrically connected to the corresponding lithium-ion cell 11. The electronic circuit component that constitutes the battery controller 130 includes a microcomputer 90.

The cell controller 120 includes a plurality of circuit elements such as a plurality of resistors 81 and a plurality of photocouplers 82. The resistor 81 is a consumption circuit element used to adjust the amount of charge in the lithium-ion cell 11 and to convert the current discharged from the lithium-ion cell 11 to heat for consumption. Each of the ICs 80A~80H is provided with four of the resistors 81 (R1~R4). The photocoupler 82 is an interface circuit element provided in each of signal transmission channels between the IC 80A, which is the beginning of the ICs 80A~80H, and the microcomputer 90 and between the IC 86H, which is the end of the ICs 80A~80H, and the microcomputer 90. The photocoupler 82 is an optical isolator element for transmitting and receiving signals with different potentials between each of the ICs 80A and 80H and the microcomputer 90.

One of the sides of the housing 70, in the present embodiment, specifically the side facing the inlet of the cooling medium is provided with a plurality of connectors. The plurality of connectors include a connector 71 for connect line and a connector 72 for external connection. The connector 71 for connect line is connected with a connector (not figured) of the connect line 110*d* electrically connected to thirty two lithium-ion cells 11. The connector 72 for external connection is coupled with connectors (not figured) of a power line for supplying drive power to the battery controller 130, a signal line through which an ON/OFF signal from the ignition key switch is input, a communication line through which communications to the vehicle controller 400 and the motor controller 330 are performed, and the like.

The plurality of lithium-ion cells 11 are allocated into a plurality of groups corresponding to each of the ICs 80A~80H. In the present embodiment, thirty two of the lithium-ion cells 11, the sum of sixteen of the lithium-ion cells 11 constituting the assembled battery 10 of the higher potential battery block 110*a* and sixteen of the lithium-ion cells 11 constituting the assembled battery 10 of the lower potential battery block 110*b*, are allocated in eight groups. Specifically, the thirty two lithium-ion cells 11 electrically connected in series are divided by each four of them in a sequential order from the top in terms of electric potential, resulting in constituting eight groups. More specifically, the thirty two lithium-ion cells 11 are grouped as follows. The first group is constituted by the lithium-ion cell group electrically connected in series including the first lithium-ion cell 11 in terms of electric potential to the fourth lithium-ion cell 11 in terms of electric potential; the second group is constituted by the lithium-ion cell group electrically connected in series including the fifth lithium-ion cell 11 in terms of electric potential to the eighth lithium-ion cell 11 in terms of electric potential; . . . ; the seventh group is constituted by the lithium-ion cell group electrically connected in series including the twenty fifth lithium-ion cell 11 in terms of electric potential to the twenty eighth lithium-ion cell 11 in terms of electric potential; and, the eighth group is constituted by the lithium-ion cell group electrically connected in series including the twenty ninth lithium-ion cell 11 in terms of electric potential to the thirty second lithium-ion cell 11 in terms of electric potential.

It should be noted that in the present embodiment an example in which the plurality of lithium-ion cells 11 are divided into four groups for each of the battery blocks is explained, however, the thirty two lithium-ion cells 11 may be divided into six groups. In this case, the thirty two lithium-ion cells 11 electrically connected in series are divided into six groups as follows. The first group is constituted by, for example, the first four lithium-ion cells 11 in terms of electric potential; the second through fifth groups is each constituted by six of the lithium-ion cells 11; and, the sixth group is constituted by the four lithium-ion cells 11.

The IC 80A is electrically connected to the positive side and negative side of each of the four lithium-ion cells 11 (BC1~BC4) constituting the first group through the connect line 110*d* and a board wiring 74. This allows the IC 80A to receive through the connect line 110*d* and the board wiring 74 an analog signal based on the terminal voltage of each of the four lithium-ion cells 11 constituting the first group. The IC 80A includes an analog/digital converter that sequentially converts received analog signals into digital signals, detecting the terminal voltage of each of the four lithium-ion cells 11 constituting the first group. The ICs 80B~80H, similarly to the IC 80A, are each electrically connected through the connect line 110*d* and the board wiring 74 to the positive side and negative side of each of the four lithium-ion cells 11 constituting the corresponding group, receiving and detecting the terminal voltage of each of the four lithium-ion cells 11 constituting the corresponding group.

Between the positive side and the negative side (between terminals) of each of the four lithium-ion cells 11 constituting the first group, bypass series circuits, in which the resistors 81 (R1~R4) and the switching semiconductor devices incorporated in the IC 80A are electrically connected in series, are electrically connected in parallel through the connect line 110*d* and the board wiring 74. In the other groups, similarly to the first group, bypass series circuits are electrically connected in parallel between the positive side and the negative side of each of the four lithium-ion cells 11.

The IC 80A electrically conducts the switching semiconductor devices individually for a predetermined period of time in response to a state of charge adjustment command which has been output from the battery controller 130 so as to electrically connect the bypass series circuits individually in parallel between the positive side and the negative side of each of the four lithium-ion cells 11 constituting the first group. This causes the lithium-ion cell 11 to which the bypass series circuit is electrically connected in parallel to discharge, thereby adjusting the state of charge (SOC) of the cell 11. The ICs 80B~80H, similarly to the IC 80A, control individually the electrical conduction of the switching semiconductor devices in the bypass series circuits electrically connected in parallel to the four lithium-ion cells 11 constituting the corresponding group, thereby adjusting individually the SOC of the four lithium-ion cells 11 constituting the corresponding group.

As described above, since the ICs 80A 80H control individually the electrical conduction of the switching semiconductor devices in the bypass series circuits electrically connected in parallel to the four lithium-ion cells 11 constituting the corresponding group so as to adjust individually the SOC of the four lithium-ion cells 11 constituting each of the groups, the SOC of the lithium-ion cells 11 of all the groups can be adjusted uniformly and the overcharge of the lithium-ion cells 11 or the like can be prevented.

The ICs 80A~80H each detect abnormality in the four lithium-ion cells 11 constituting the corresponding group. The abnormality includes overcharge and overdischarge. The overcharge and overdischarge are detected in each of the ICs 80A~80H by comparing detected values of the terminal voltage of the four lithium-ion cells 11 constituting the corresponding group and each of an overcharge threshold and an overdischarge threshold. The overcharge is judged when the detected value of the terminal voltage exceeds the overcharge threshold while the overdischarge is judged when the detected value of the terminal voltage falls below the overdischarge threshold. In addition, the ICs 80A~80H self-diagnose abnormality in their internal circuits, e.g., abnormality in the switching semiconductor devices used to adjust the SOC, abnormality in temperature, and the like.

Thus, the ICs 80A~80H are each constituted by the same internal circuits so as to perform the same functions, i.e., detection of the terminal voltage of the four lithium-ion cells 11 (BC1~BC4) constituting the corresponding group, adjustment of the SOC, detection of abnormality, and the abnormality diagnosis of their internal circuits.

One side of each of the ICs 80A~80H is provided with a plurality of terminals electrically connected to the battery module 110. The plurality of terminals include a source terminal (Vcc), voltage terminals (V1~V4 and GND), and bypass terminals (B1~B4). The voltage terminals (V1~V4 and GND) are electrically connected with the board wirings 74 electrically connected to the connect line 110d. The bypass terminals (B1~B4) are electrically connected to the switching semiconductor devices of the resistors 81 through the board wirings 74. The other side of each of the resistors 81, which is opposite to the side of the switching semiconductor devices, is electrically connected to the board wiring 74 which is in turn electrically connected to the voltage terminal through the board wiring 74. The source terminal (Vcc) is electrically connected to the board wiring 74 electrically connected to the voltage terminal V1 which is a voltage terminal electrically connected to the positive side of the lithium-ion cell 11 of the highest potential side.

The voltage terminals (V1~V4 and GND) and the bypass terminals (B1~B4) are alternately arranged in the order of the potential of the lithium-ion cells 11 electrically connected thereto. This facilitates the configuration of the electrical connection circuits between each of the ICs 80A~80H and the connect line 110d.

The voltage terminal GND is electrically connected to the negative side of the lithium-ion cell BC4 which is the lowest potential of the four lithium-ion cells 11 constituting the corresponding group. This causes each of the ICs 80A~80H to operate with the lowest potential of the corresponding group as reference potential. Since the reference potentials of each of the ICs 80A 80H are different from one another, the difference in voltage applied from the battery module 110 to each of the ICs 80A~80H is reduced, thereby reducing breakdown voltage of the ICs 80A~80H and improving safety and reliability.

The source terminal Vcc is electrically connected to the positive side of the lithium-ion cell BC1 which is the highest potential of the four lithium-ion cells 11 constituting the corresponding group. This causes each of the ICs 80A~80H to generate the voltage (for example, 5V) for the operation of the internal circuit from the highest potential of the corresponding group. Operating voltage of the internal circuit of each of the ICs 80A~80H is thus generated from the voltage of the highest potential of the corresponding group, thereby uniforming the power consumed by the four lithium-ion cells 11 constituting the corresponding group and preventing the SOC of the four lithium-ion cells 11 constituting the corresponding group from becoming imbalanced.

The other side of each of the ICs 80A~80H (the side opposite of the side on which terminals for voltage are provided) is provided with a plurality of terminals for communication. The plurality of terminals for communication include communication command signal transmitting and receiving terminals (TX and RX) for transmitting and receiving communication command signals and abnormality signal transmitting and receiving terminals (FFO and FFI) for transmitting and receiving abnormality signals and abnormality test signals.

The communication command signal transmitting and receiving terminals (TX and RX) of the ICs 80A~80H are uninsulated and electrically connected in series in the order of the potential of the corresponding group. More specifically, the communication command signal transmitting terminal (TX) and the communication command signal receiving terminal (RX) are uninsulated and electrically connected in series as follows. The communication command signal transmitting terminal (TX) of the IC 80A which is the IC with the highest potential and the communication command signal receiving terminal (RX) of the IC 80B which is the IC with the second highest potential are uninsulated and electrically connected in series; the communication command signal transmitting terminal (TX) of the IC 80B and the communication command signal receiving terminal (RX) of the IC 80C are uninsulated and electrically connected in series; . . . ; and, the communication command signal transmitting terminal (TX) of the IC 80G and the communication command signal receiving terminal (RX) of the IC 80H are uninsulated and electrically connected in series. This connection method will be referred to as Daisy chain in the present embodiment.

The abnormality signal transmitting and receiving terminals (FFO and FFI) of the IC 80A~80H bear the same relation of connection to the communication command signal transmitting and receiving terminals (TX and RX), being uninsulated and electrically connected in series in the order of the potential of the corresponding group. Specifically, the abnormality signal transmitting terminal (FFO) of the IC with the highest potential and the abnormality signal receiving terminal (FFI) of the IC with the second highest potential are uninsulated and electrically connected in series.

The communication command signal receiving terminal (RX) of the IC 80A, which corresponds to the highest potential group of the plurality of lithium-ion cells 11, is electrically connected to a light-receiving side of the photocoupler 82a (PH1). A light-transmitting side of the photocoupler 82a is electrically connected to a communication command signal transmitting terminal (TX) of the microcomputer 90. The communication command signal transmitting terminal (TX) of the IC 80H, which corresponds to the lowest potential group of the plurality of lithium-ion cells 11, is electrically connected to a light-transmitting side of the photocoupler 82c (PH3). A light-receiving side of the photocoupler 82c is electrically connected to a communication command signal receiving terminal (RX) of the microcomputer 90. These connections result in forming between the cell controller 120 and the battery controller 130 a loop transmission channel 83 for communication command signal that is electrically insulated there between and extends from the microcomputer 90 to the microcomputer 90 through the photocoupler 82a, the IC 80A, . . . , the IC 80H, and the photocoupler 82c in the order thereof. The loop transmission channel 83 is a serial transmission channel.

The communication command signal is output from the microcomputer 90 and transmitted through the loop transmission channel 83. The communication command signal is a signal of a plurality of bytes with a plurality of data areas such as a data area showing communication (control) contents, which is transmitted in a loop manner in the transmission order described above.

The communication command signal output from the microcomputer 90 to the ICs 80A~80H through the communication command signal loop transmission channel 83 includes a request signal for requesting the detected terminal voltage of the lithium-ion cell 11, a command signal for adjusting the SOC of the lithium-ion cell 11, an activation signal for waking up, i.e., activating each of the ICs 80A~80H from a sleep state, a stop signal for putting each of the ICs 80A~80H to sleep from a wake-up state, i.e., stopping the operation, an address setting signal for setting an address for communication of each of the ICs 80A~80H, and an abnormality identification signal for identifying an abnormality state in the ICs 80A~80H.

It should be noted that in the present embodiment an example in which the communication command signal is transmitted from the IC 80A to the IC 80H is explained, however, the communication command signal may be configured to be transmitted from the IC 80H to the IC 80A.

Furthermore, the abnormality signal receiving terminal (FFI) of the IC 80A, which corresponds to the highest potential group of the plurality of lithium-ion cells 11, is electrically connected to a light-receiving side of the photocoupler 82*b* (PH2). A light-transmitting side of the photocoupler 82*b* is electrically connected to an abnormality test signal transmitting terminal (FFTEST) of the microcomputer 90. The abnormality signal transmitting terminal (FFO) of the IC 80H, which corresponds to the lowest potential group of the plurality of lithium-ion cells 11, is electrically connected to a light-transmitting side of the photocoupler 82*d* (PH4). A light-receiving side of the photocoupler 82*d* is electrically connected to an abnormality signal receiving terminal (FF) of the microcomputer 90. These connections result in forming between the cell controller 120 and the battery controller 130 a loop transmission channel 84 for abnormality signal that is electrically insulated there between and extends from the microcomputer 90 to the microcomputer 90 through the photocoupler 82*a*, the IC 80A, . . . , the IC 80H, and the photocoupler 82*c* in the order thereof. The loop transmission channel 84 is a serial transmission channel.

The abnormality test signal is output from the microcomputer 90 and transmitted through the abnormality signal loop transmission channel 84. The abnormality test signal is a one-bit hi-level signal to be transmitted for detecting abnormality in the ICs 80A~80H, disconnection of a communication circuit, or the like, which is transmitted in the transmission order described above. In the case of abnormality, the abnormality test signal returns to the microcomputer 90 as a low-level signal. This causes the microcomputer 90 to detect the abnormality in the ICs 80A~80B, disconnection of a communication circuit, or the like. When abnormality is detected in either of the ICs 80A~80H, a signal indicating abnormality from a given IC in which the abnormality has been detected, e.g., the IC 80C, is output to the abnormality signal loop transmission channel 84. The signal indicating abnormality is a one-bit signal, which is transmitted to the microcomputer 90 through the IC 80D, . . . , the IC 80H, and the photocoupler 82*d* in the order thereof. This allows the microcomputer 90 to be immediately notified of the abnormality from a given IC in which the abnormality has been detected.

It should be noted that in the present embodiment an example in which the abnormality test signal is transmitted from the IC 80A to the IC 80H is explained, however, the abnormality test signal may be configured to be transmitted from the IC 80H to the IC 80A. In addition, in the present embodiment an example in which the signal indicating abnormality is transmitted from the IC in which the abnormality has been detected to the IC with a lower potential is explained, however, the signal indicating abnormality may be configured to be transmitted from the IC in which the abnormality has been detected to the IC with a higher potential.

The photocouplers 82*a*~82*d* (PH1~PH4) electrically insulate the communication command signal loop transmission channel 83 and the abnormality signal loop transmission channel 84 between the cell controller 120 and the battery controller 130 and convert the signals transmitted and received between the cell controller 120 and the battery controller 130 into light for transmission. As described above, the cell controller 120 and the battery controller 130 are greatly different from each other in power source potential and power source voltage. Therefore, a signal transmission by the cell controller 120 and the battery controller 130 electrically connected there between requires a potential conversion and a voltage conversion of the signal to be transmitted. The conversions require a large, costly interface circuit between the cell controller 120 and the battery controller 130, making it impossible to provide a small, less-costly control device. In the present embodiment, on the other hand, the communication between the cell controller 120 and the battery controller 130 is performed using the photocouplers 82*a*~82*d* (PH1~PH4), enabling to downsize the control device and to reduce the manufacturing costs.

Moreover, as described above, each of the ICs 80A~80H has the power source potential different from each other. However, in the present embodiment, since the ICs 80A~80H are electrically connected in series, i.e. by the daisy chain system, in the order of the potential of the corresponding group in the assembled battery 10, the signal transmission between each of the ICs 80A~80H can be easily performed by the potential conversion (level shift). Each of the ICs 80A~80H includes a potential conversion (level shift) circuit on the signal receiving side. Accordingly, in the present embodiment, since the signal transmission between each of the ICs 80A~80H can be performed without a photocoupler which is more costly than other circuit elements, achieving in providing a small, less-costly control device.

The microcomputer 90 receives various signals and, based upon input information obtained from the various signals input thereto or based upon calculation information obtained through calculation using the input information, transmits the communication command signal described above to the cell controller 120. The microcomputer 90 also outputs a signal to the higher-rank control devices, such as the motor controller 330 and the vehicle controller 400.

The various signals to be received by the microcomputer 90 include terminal voltage signals of each of the lithium-ion cells 11 which have been output from each of the ICs 80A~80H, the abnormality signal which has been output from a given IC in which an abnormality is detected among the ICs 80A~80H, a current sensor signal which has been output from the current sensor 143 for detecting a charge/discharge current of the battery module 110, a voltage sensor signal which has been output from a voltage sensor 170 for detecting a total voltage of the battery module 110, a temperature sensor signal which has been output from a temperature sensor (for example, a thermistor element) 171 provided in the battery module 110 so as to detect the temperature of the assembled battery 10, the ON/OFF signal based upon the operation of the ignition key switch, and signals which have been output from the higher-rank control devices (the motor controller 330 and the vehicle controller 400).

The various signals to be output from the microcomputer 90 include the communication command signal described above, signals that correspond to information on chargeable/dischargeable power, the SOC, the SOH, and the like which are calculated based upon state information (for example, voltage, current, temperature, etc.) of the battery module 110, and signals that correspond to abnormality state information (for example, overcharge, overdischarge, over temperature, etc.) determined from the calculation results based on the state information of the battery module 110 (for example, voltage, current, temperature, etc.) or abnormality information.

Among those output signals, the signals that correspond to information on the chargeable/dischargeable power, the SOC, the SOH, and the like and the signals that correspond to abnormality state information (for example, overcharge, overdischarge, over temperature, etc.) are output to the higher-rank control devices (the motor controller 330 and the vehicle controller 400).

Second Embodiment

Figure 9:
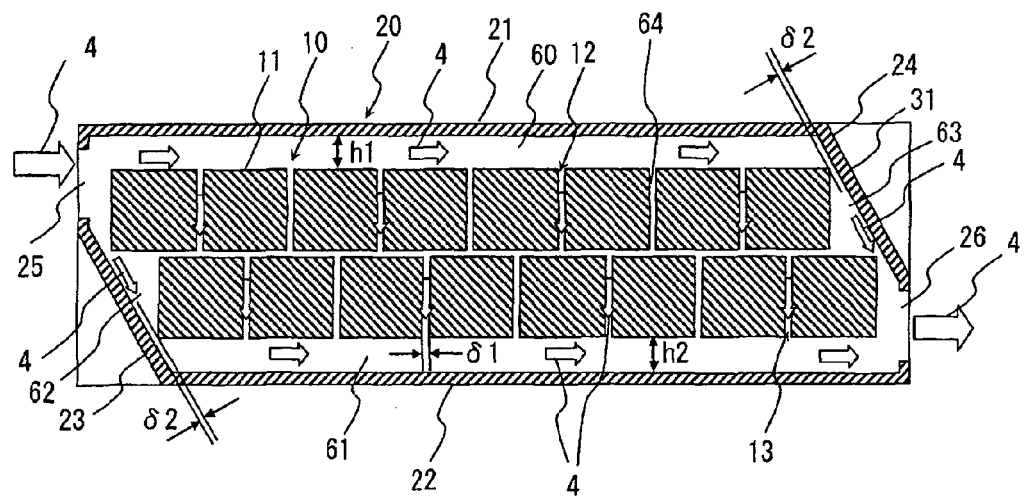
FIG. 9 is a cross-sectional view of an electric storage device of a second embodiment of the present invention, showing the configuration of a battery block that constitutes the battery module.

The second embodiment of the present invention will now be explained with reference to FIG. 9. While in the first embodiment the lithium-ion cells 11 are cylindrical (columnar), in the present embodiment the lithium-ion cells 11 are rectangular (square prism). The length of a side at a cross-section perpendicular to the transverse direction of the lithium-ion cell 11 is the same as the diameter D of the cylindrical lithium-ion cell of the first embodiment.

The rest of the configuration is identical to that of the first embodiment. Therefore, a component in common with the first embodiment is attached with a reference symbol identical to that of the first embodiment in FIG. 9 and the explanation thereon is omitted.

According to the present embodiment described above, the operational effects same as those of the first embodiment can be achieved.

Third Embodiment

Figure 10:
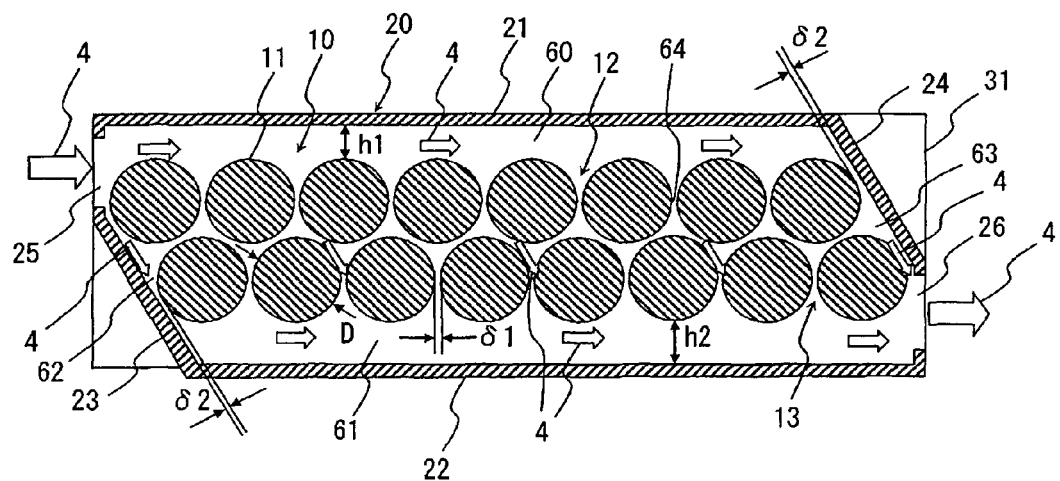
FIG. 10 is a cross-sectional view of an electric storage device of a third embodiment of the present invention, showing the configuration of a battery block that constitutes the battery module.

The third embodiment of the present invention will now be explained with reference to FIG. 10. The present embodiment is a modification of the first embodiment, wherein the height of the inlet-side passage 60. As shown in FIG. 10, the height h1 between the closest regions to the inlet passage forming plate 21 of the lithium-ion cells 11 constituting the first cell string 12 and the inner wall of the inlet passage forming plate 21 in the height direction is configured to be larger than the height of the outlet-side passage 61, i.e., the height h2 between the closest regions to the outlet passage forming plate 22 of the lithium-ion cells 11 constituting the second cell string 13 and the inner wall of the outlet passage forming plate 22 in the height direction. Thus, the size ratio of the height h2 of the outlet-side passage 61 to the diameter D of the lithium-ion cell 11 is configured to be larger than 0.25~0.5 which is the size ratio of the height h1 of the inlet-side passage 60 to the diameter D of the lithium-ion cell 11. In addition, the size of the opening of the cooling medium outlet 26 in the height direction is configured to be larger than that of the cooling medium inlet 25 in the height direction.

The cooling efficiency of the lithium-ion cells 11 constituting the second cell string 13 may be deteriorated as the lithium-ion cells 11 constituting the second cell string 13, particularly the lithium-ion cells 11 disposed downstream (the cooling medium outlet 26 side) is not cooled but instead is heated due to the heat exchange between the heated cooling medium which passes through the outlet-side passage 61 and the lithium-ion cells 11 constituting the second cell string 13. This phenomenon can be prevented in the present embodiment by enlarging the height h2 of the outlet-side passage 61. In addition, in the present embodiment, the enlarged height h2 of the outlet-side passage 61 allows the pressure loss in the outlet-side passage 61 to be reduced.

The rest of the configuration is identical to that of the first embodiment. Therefore, a component in common with the first embodiment is attached with a reference symbol identical to that of the first embodiment in FIG. 10 and the explanation thereon is omitted.

According to the present embodiment described above, the cooling efficiency can be improved than that of the first embodiment. The other operational effects can be achieved similarly to those of the first embodiment.

Fourth Embodiment

The fourth embodiment of the present invention will now be explained with reference to FIG. 11. The present embodiment is a modification of the first embodiment. As explained in the third embodiment, the heated cooling medium passes through the outlet-side passage 61. The heated cooling medium thus reduces the cooling efficiency of the lithium-ion cells 11 constituting the second cell string 13 since the heated cooling medium passing through the outlet-side passage 61 does not cool but heats the lithium-ion cells 11 constituting the second cell string 13, particularly the lithium-ion cells 11 disposed downstream (the cooling medium outlet 26 side) through the heat exchange between the heated cooling medium and the lithium-ion cells 11 constituting the second cell string 13.

Figure 11:
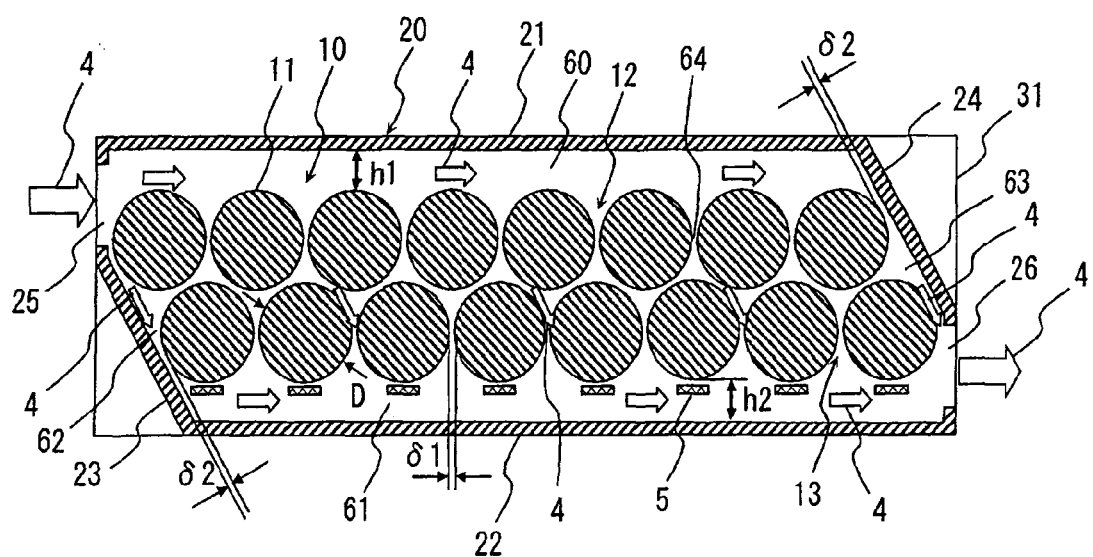
FIG. 11 is a cross-sectional view of an electric storage device of a fourth embodiment of the present invention, showing the configuration of a battery block that constitutes the battery module.

In the present embodiment, as shown in FIG. 11, a thermal insulation board 5 is arranged in the region of each of the lithium-ion cells 11 constituting the second cell string 13 facing the outlet-side passage 61 at the bottom end side of the lithium-ion cell 11 the height direction so as to reduce the heat exchange between the lithium-ion cells 11 constituting the second cell string 13 and the cooling medium passing through the outlet-side passage 61. The thermal insulation board 5 is a flat low-thermal conductive member made of a low-thermal conductive metal or plastic, lying elongated in the transverse direction along the peripheral surface of the lithium-ion cell 11.

The rest of the configuration is identical to that of the first embodiment. Therefore, a component in common with the first embodiment is attached with a reference symbol identical to that of the first embodiment in FIG. 11 and the explanation thereon is omitted.

According to the present embodiment described above, since the reduction of the cooling efficiency of the lithium-ion cells 11 constituting the second cell string 13 can be prevented, the cooling efficiency can be improved than that of the first embodiment. The other operational effects can be achieved similarly to those of the first embodiment.

Fifth Embodiment

Figure 12:
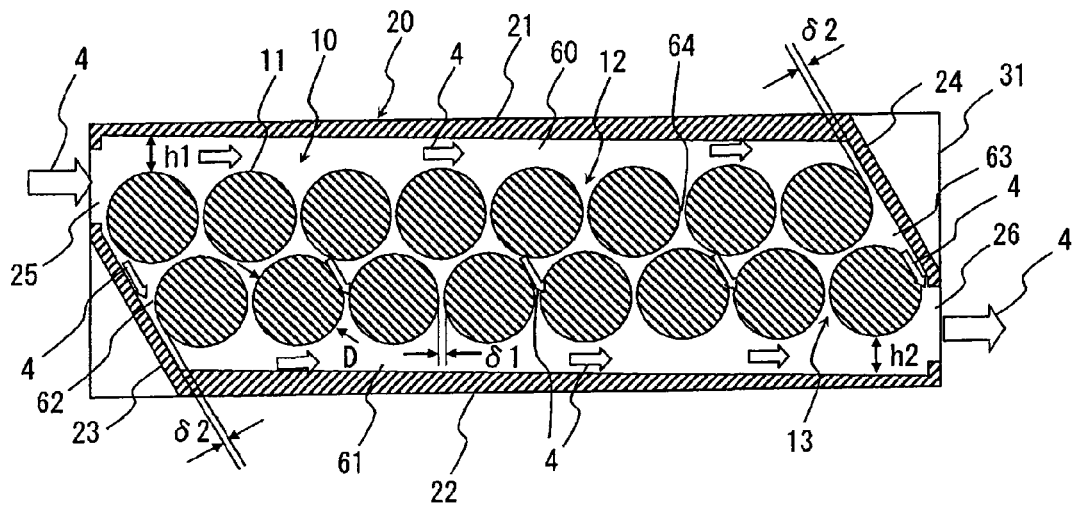
FIG. 12 is a cross-sectional view of an electric storage device of a fifth embodiment of the present invention, showing the configuration of a battery block that constitutes the battery module.

The fifth embodiment of the present invention will now be explained with reference to FIG. 12. The present embodiment is a modification of the first embodiment. The thickness of the inlet passage forming plate 21 gradually increases from the cooling medium inlet 25 side toward the cooling medium outlet 26 side so that the height of the inlet-side passage 60, i.e., the height h1 between the closest regions to the inlet passage forming plate 21 of the lithium-ion cells 11 constituting the first cell string 12 and the inner wall of the inlet passage forming plate 21 in the height direction is at its largest in the cooling medium inlet 25 side and is gradually becoming smaller along the inlet-side passage 60 toward the cooling medium outlet 26 side as the cooling medium flows downstream. More specifically, the inner wall of the inlet passage forming plate 21, which is the wall on the side of the passage 60, is sloped or gradually inclined toward the assembled battery 10 from the cooling medium inlet 25 side to the cooling medium outlet 26 side. On the other hand, the thickness of the outlet passage forming plate 22 tapers or gradually decreases from the cooling medium inlet 25 side toward the cooling medium outlet 26 side so that the height of the outlet-side passage 61, i.e., the height h2 between the closest regions to the outlet passage forming plate 22 of the lithium-ion cells 11 constituting the second cell string 13 and the inner wall of the outlet passage forming plate 22 in the height direction is at its smallest in the cooling medium inlet 25 side and is gradually becoming larger along the outlet-side passage 61 toward the cooling medium outlet 26 side as the cooling medium flows downstream. More specifically, the inner wall of the outlet passage forming plate 22, which is the wall on the side of the passage 61, is sloped or gradually inclined away from the assembled battery 10 from the cooling medium inlet 25 side toward the cooling medium outlet 26 side.

It should be noted that in the present embodiment, an example in which the inclination or slope is formed by gradually varying the thickness of the inlet passage forming plate 21 and the outlet passage forming plate 22 is explained. However, separate inclination (taper) members may be connected to the inner wall of the inlet passage forming plate 21 and the outlet passage forming plate 22 so as to vary the height h1 of the inlet-side passage 60 and the height h2 of the outlet-side passage 61.

The rest of the configuration is identical to that of the first embodiment. Therefore, a component in common with the first embodiment is attached with a reference symbol identical to that of the first embodiment in FIG. 12 and the explanation thereon is omitted.

According to the present embodiment described above, static pressure distribution of the inlet-side passage 60 can be equalized since the cross-sectional area of the inlet-side passage 60 gets smaller along the flow direction of the cooling medium, i.e., the direction from the cooling medium inlet 25 side toward the cooling medium outlet 26 side. According to the present embodiment, this allows the cooling medium to be introduced through the inter-cell passage 64 at a more uniform flow rate so as to cool each of the lithium-ion cells 11 by the cooling medium at a more uniform flow rate. In addition, the pressure loss of the cooling medium passing through the inter-unit-cell passage 64 can be reduced. Therefore, according to the present embodiment, the temperature rise of each of the lithium-ion cells 11 may be reduced more effectively than that of achieved in the first embodiment and the temperature rise of each of the lithium-ion cells 11 can be equalized, thereby improving the cooling efficiency of the lithium-ion cells 11. In addition, with the improved cooling efficiency, the battery module 110 may be further downsized according to the present embodiment. The other operational effects can be achieved similarly to those of the first embodiment.

Sixth Embodiment

Figure 13:
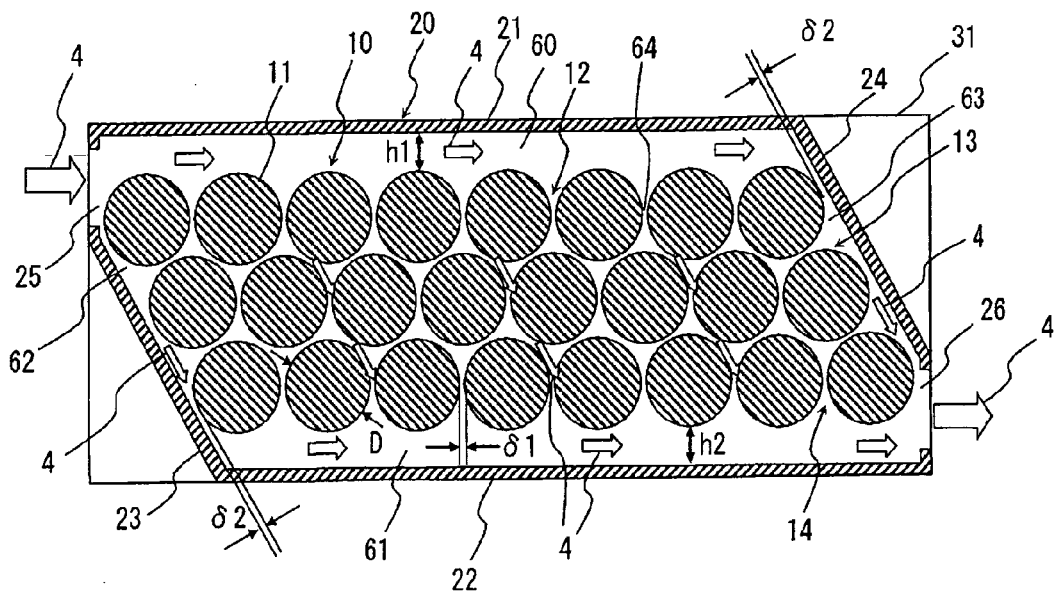
FIG. 13 is a cross-sectional view of an electric storage device of a sixth embodiment of the present invention, showing the configuration of a battery block that constitutes the battery module.

The sixth embodiment of the present invention will now be explained with reference to FIG. 13. The present embodiment is a modification of the first embodiment. An other cell string is added so that the assembled battery 10 is configured with the first, the second and a third cell strings 12~14 stacked on top of another. Accordingly, the number of the lithium-ion cells 11 of the assembled battery 10 is twenty four.

The first cell string 12 is arranged closer to the inlet passage forming plate 21 than the second cell string 13 is, and arranged obliquely closer to the cooling medium inlet 25 than the second cell string 13 is. The third cell string 14 is arranged closer to the outlet passage forming plate 22 than the second cell string 13 is, and arranged obliquely closer to the cooling medium outlet 26 than the second cell string 13 is. In the present embodiment, the first to the third cell strings 12~14 are arranged obliquely in the longitudinal direction so that the longitudinal position of the central axis of the lithium-ion cell 11 disposed closest to the cooling medium outlet 26 in the second cell string 13 lies at the midpoint between the central axis of the lithium-ion cell 11 disposed closest to the cooling medium outlet 26 in the third cell string 14 and that of the lithium-ion cell 11 lying next thereto. At the same time, the longitudinal position of the central axis of the lithium-ion cell 11 disposed closest to the cooling medium outlet 26 in the first cell string 12 lies at the midpoint between the central axis of the lithium-ion cell 11 disposed closest to the cooling medium outlet 26 in the second cell string 13 and that of the lithium-ion cell 11 lying next thereto.

The outlet-side passage 61 is formed in the space or gap between the outlet passage forming plate 22 and the third cell string 14. The inter-cell passage 64 is formed in each of predetermined spaces or gaps between the first cell string 12 and the second cell string 13, between the second cell string 13 and the third cell string 14, and between the lithium-ion cells 11 arranged in the longitudinal direction of each of the first to the third cell strings 12~14. The inlet-side guide passage 62 is formed in the space or gap between the lithium-ion cells 11 disposed closest to the cooling medium inlet 25 in each of the first to the third cell strings 12~14 and the inlet-side guide plate 23. The outlet-side guide passage 63 is formed in the space or gap between the lithium-ion cells 11 disposed closest to the cooling medium outlet 26 in each of the first to the third cell strings 12~14 and the outlet-side guide plate 24.

The cooling medium outlet 26 is formed on the longitudinal extension of the third cell string 14 and the outlet-side passage 61. the position in the height direction of the central axis or midpoint of the cooling medium outlet 26 is on a lower level than that on which the central axis of the lithium-ion cell 11 disposed closest to the cooling medium outlet 26 in the third cell string 14 is, and is on a higher level than the regions of the lithium-ion cells 11 constituting the third cell string 14 closest to the outlet-side passage 61 or to the outlet passage forming plate 22.

Each of the higher potential battery block 110a and the lower potential battery block 110b has a rotationally symmetric structure (reversible structure), similarly to that in the first embodiment.

In the present embodiment, δ1 denotes the width of the smallest gap between the lithium-ion cells 11 lying longitudinally next to each other (the arranging direction of the lithium-ion cells 11) in the first to the third cell strings 12~14. δ2 denotes the width of the longitudinal gap between the inner wall surface of the inlet-side guide plate 23 and the closest region to the cooling medium inlet 25 of the lithium-ion cell 11 disposed closest to the cooling medium inlet 25 in each of the first to the third cell strings 12~14 and the width of the longitudinal gap between the inner wall surface of the outlet-side guide plate 24 and the closest region to the cooling medium outlet 26 of the lithium-ion cell 11 disposed closest to the cooling medium outlet 26 in each of the first to the third cell strings 12~14. In denotes the same as in the first embodiment. h2 denotes the height from the inner wall surface of the outlet passage forming plate 22 to the closest regions to the outlet passage forming plate 22 of the lithium-ion cells 11 constituting the third cell string 14. The ratio of the heights h1 and h2 to the diameter D of the lithium-ion cell 11 and the ratio of the gaps δ1 and δ2 to the diameter D is the same as that of the first embodiment.

The rest of the configuration is identical to that of the first embodiment. Therefore, a component in common with the first embodiment is attached with a reference symbol identical to that of the first embodiment in FIG. 13 and the explanation thereon is omitted.

According to the present embodiment described above, while achieving the improved cooling efficiency, storage capacity can be increased than that in the first embodiment. The other operational effects can be achieved similarly to those of the first embodiment. In addition, cooling efficiency can be improved even more by combining the configurations described in the second to the fifth embodiments.

Seventh Embodiment

Figure 14:
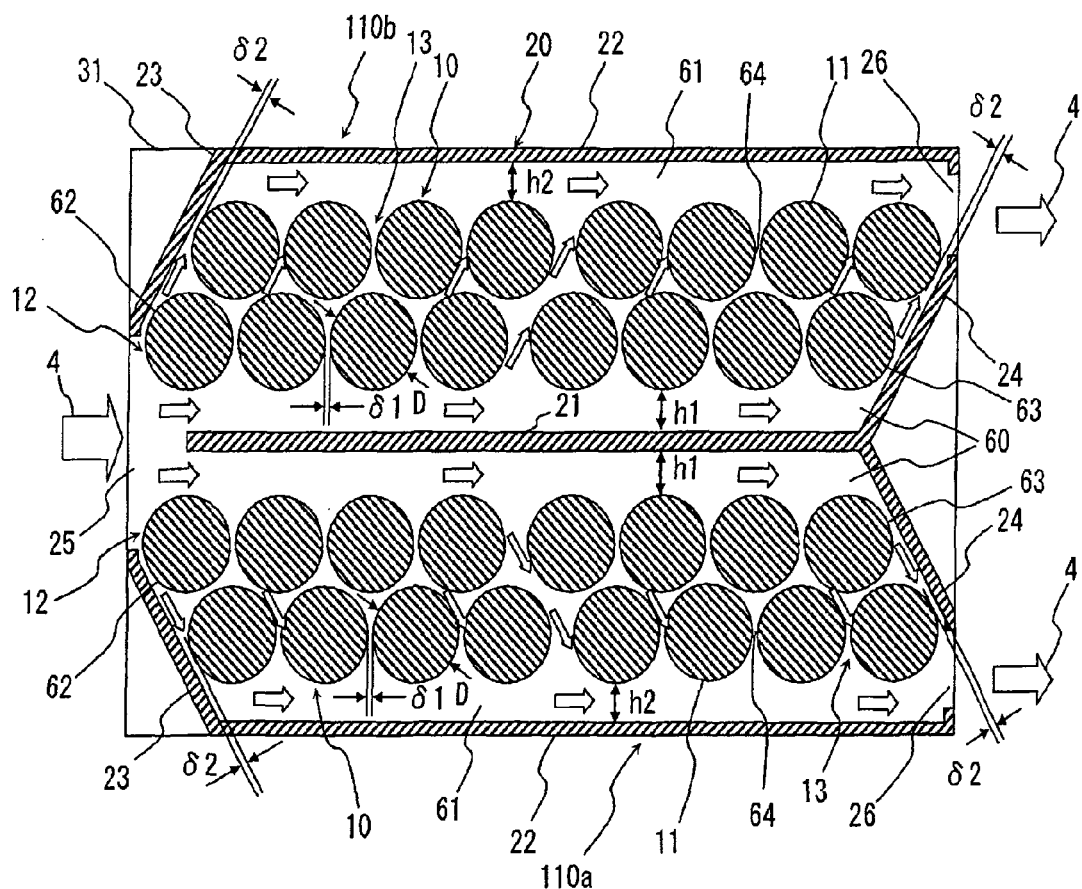
FIG. 14 is a cross-sectional view of an electric storage device of a seventh embodiment of the present invention, showing the configuration of a battery block that constitutes the battery module.

The seventh embodiment of the present invention will now be explained with reference to FIG. 14. The present embodiment is a modification of the first embodiment. The higher potential battery block 110a and the lower potential battery block 110b are not juxtaposed in a plane as in the first embodiment but stacked with the inlet passage forming plates 21 of the higher potential battery block 110a and the lower potential battery block 11b facing each other in the height direction as shown in FIG. 14. In other words, the battery module 110 in the present embodiment is configured such that the higher potential battery block 110a and the lower potential battery block 110b are arranged axisymmetric with respect to the inlet passage forming plate 21. The battery module 110 may be installed, as in the first embodiment, in the height direction with the outlet passage forming plate 22 of either the higher potential battery block 110a or the lower potential battery block 110b down. The battery module 110 may instead be installed in the transverse direction with either the side plate 30 of the higher potential battery block 110a and the side plate 31 of the lower potential battery block 110b or the side plate 31 of the higher potential battery block 110a and the side plate 30 of the lower potential battery block 110b down.

The cooling medium inlet 25 of the higher potential battery block 110a and the lower potential battery block 110b is constituted by a single opening in common. The inlet passage forming plate 21 of the higher potential battery block 110a and the lower potential battery block 110b is constituted by a single flat plate in common, constituting a partition that separates between the inlet-side passage 60 of the higher potential battery block 110a and the inlet-side passage 60 of the lower potential battery block 110b.

In each of the assembled batteries 10 of the higher potential battery block 110a and the lower potential battery block 110b, the minimum gap in the longitudinal direction between the fourth lithium-ion cell 11 and the fifth lithium-ion cell 11 of each of the first and the second cell strings 12 and 13 is larger than the corresponding gaps between the other lithium-ion cells 11 as shown in FIG. 14.

It should be noted that while in the present embodiment the assembled battery 10 is configured with two layers or stacks of the lithium-ion cell strings, it may includes three layers of the lithium-ion cell strings, similarly to the sixth embodiment.

The rest of the configuration is identical to that of the first embodiment. Therefore, a component in common with the first embodiment is attached with a reference symbol identical to that of the first embodiment in FIG. 14 and the explanation thereon is omitted.

According to the present embodiment described above, since the higher potential battery block 110a and the lower potential battery block 110b are integrally configured, some of the components can be shared to reduce the number of the components, thereby reducing the manufacturing cost. The other operational effects can be achieved similarly to those of the first embodiment.

Eighth Embodiment

Figure 15:
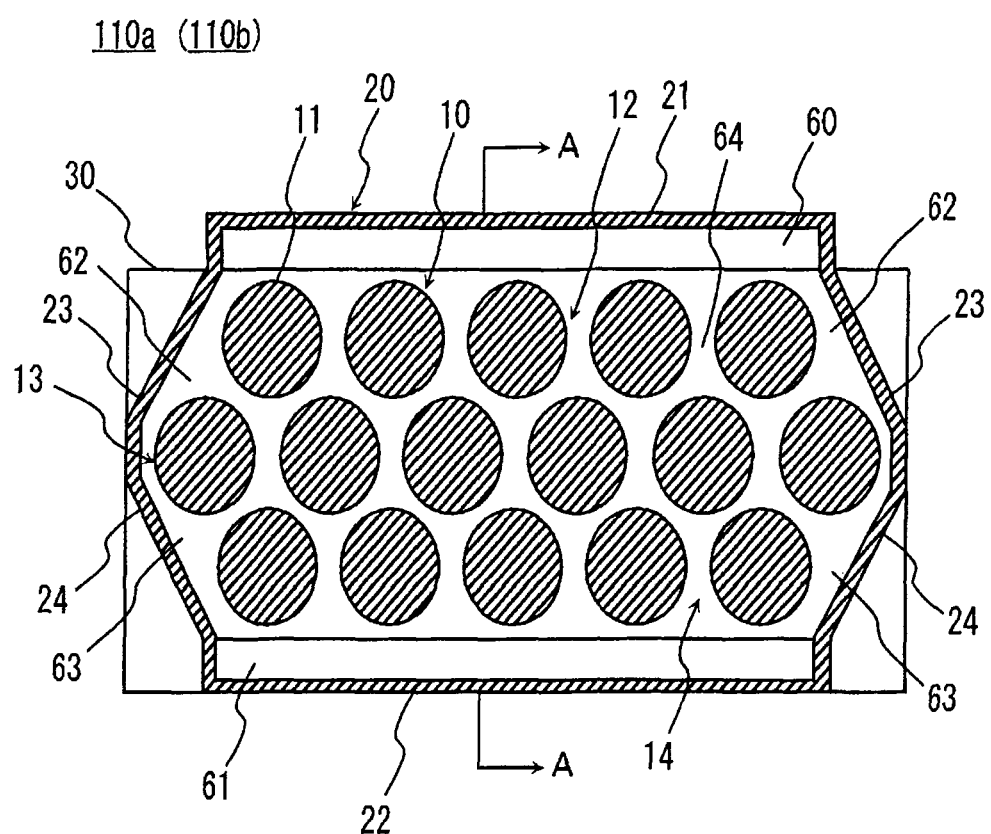
FIG. 15 is a cross-sectional view of an electric storage device of an eighth embodiment of the present invention, showing the configuration of a battery block that constitutes the battery module.
Figure 16:
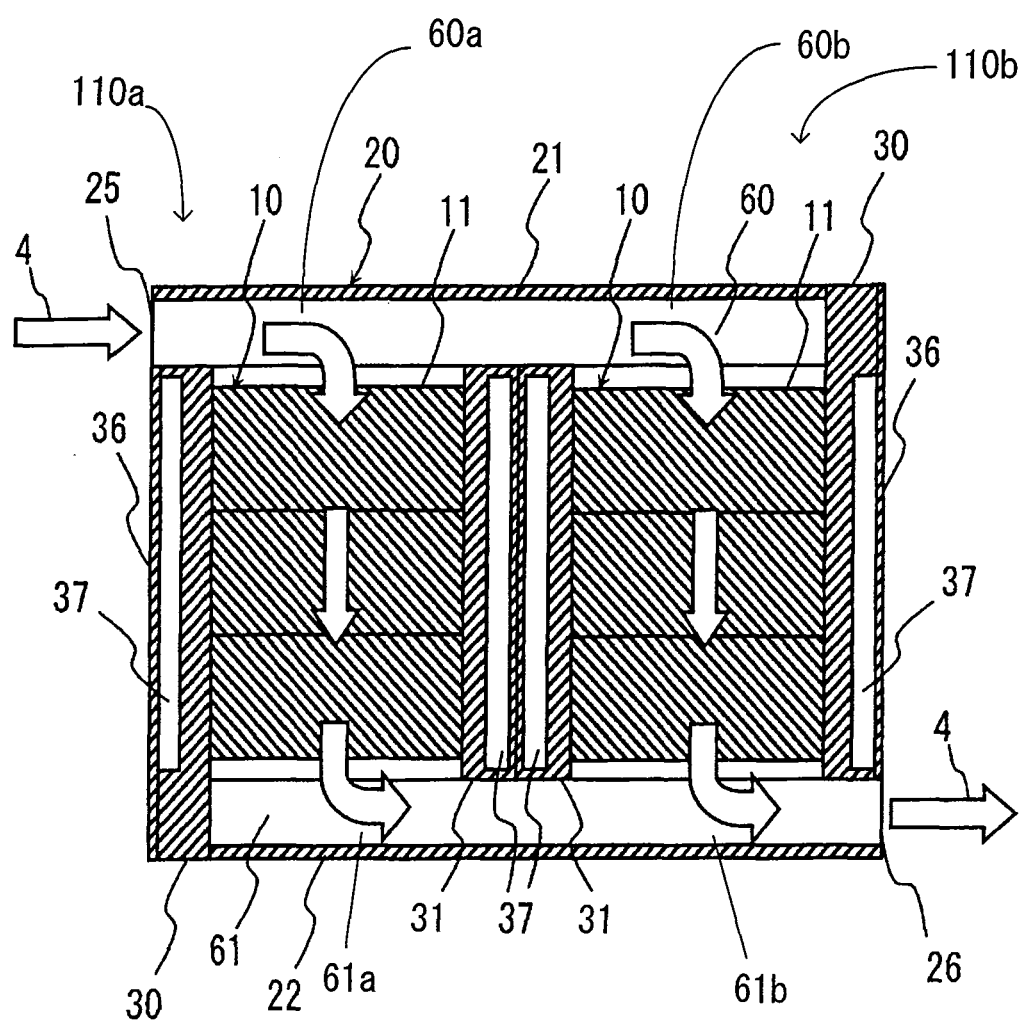
FIG. 16 shows a structure of an A-A cross-section of FIG. 15.

The eighth embodiment of the present invention will now be explained with reference to FIGS. 15 and 16. FIG. 15 shows a cross-sectional view of the higher potential battery block 110a as a representative and FIG. 16 shows a structure of an A-A cross-section of FIG. 15. The present embodiment is a modification of the first embodiment. In the present embodiment, as in the first embodiment, each of the higher potential battery block 110a and the lower potential battery block 110b is provided with the inlet passage forming plate 21, the outlet passage forming plate 22, the inlet-side guide plate 23, the outlet-side guide plate 24, the side plates 30 and 31, and the assembled battery 10. As in the first embodiment, in each of the battery blocks, the inlet-side passage 60, the outlet-side passage 61, the inlet-side guide passage 62, the outlet-side guide passage 63, the inter-cell passage 64, the cooling medium inlet 25, and the cooling medium outlet 26 are formed.

In the present embodiment, however, the cooling medium 4 flows differently from that in the first embodiment. Specifically, in the present embodiment, the cooling medium 4 is supplied through the cooling medium inlet 25 from one side of the battery module 110 in the transverse direction and passes through the inlet-side passage 60 along the transverse direction. The cooling medium 4 then changes its flow direction at a right angle to the height direction and flows into the assembled battery 10. The cooling medium 4 then flows out of the assembled battery 10 and enters the outlet-side passage 61. The cooling medium 4 changes again its flow direction at a right angle to the transverse direction, passes through the outlet-side passage 61 along the transverse direction, and is discharged the cooling medium outlet 26 from the other side in the transverse direction.

Therefore, in the present embodiment, the higher potential battery block 110a and the lower potential battery block 110b are juxtaposed in the transverse direction so as to integrally connect the inlet-side passages 60a and 60b of the battery blocks extending in the transverse direction, thereby forming the single inlet-side passage 60 extending in the transverse direction. At one side of the inlet-side passage 60 in the transverse direction, in the side plate 30 of the higher potential battery block 110a the cooling medium inlet 25 is formed. The other side or end of the inlet-side passage 60 in the transverse direction is blocked or covered by the side plate 31 of the lower potential battery block 110b. In addition, similarly to the inlet-side passage 60, the outlet-side passages 61a and 60b of the battery blocks extending in the transverse direction are integrally connected so as to form the single outlet-side passage 61 extending in the transverse direction. At one side or end of the outlet-side passage 61 in the transverse direction, in the side plate 30 of the lower potential battery block 110*b* the cooling medium outlet 26 is formed. The other side of the outlet-side passage 61 in the transverse direction is defined or covered with the side plate 30 of the higher potential battery block 110*a*.

The assembled batteries 10, similarly to that in the first embodiment, are each constituted by the sixteen of cylindrical (columnar) lithium-ion cells 11 and aligned in order between the inlet-side passage 60 and the outlet-side passage 61 in the casing 20, with the central axis of each of the lithium-ion cells 11 lying in the transverse direction. However, the assembled batteries 10 are aligned differently from those in the first embodiment. In the present embodiment, the assembled battery 10 is constituted by three layers or stacks of the first to the third cell strings 12~14. The first cell string 12, which is disposed closest to the inlet-side passage 60, is constituted by five of the lithium-ion cells 11 in accordance with the longitudinal width of the inlet-side passage 60. Similarly, the third cell string 14, which is disposed closest to the outlet-side passage 61, is constituted by five of the lithium-ion cells 11 in accordance with the longitudinal width of the outlet-side passage 61. The second cell string 13, which is disposed between the first cell string 12 and the third cell string 14 in the height direction, is constituted by the remaining six of the lithium-ion cells 11.

Although the longitudinal positions of the first and the third cell strings 12 and 14 are the same as each other, they are different from that of the second cell string 13. In the present embodiment, each of the first and the third cell strings 12 and 14 is arranged obliquely to the second cell string 13 in the longitudinal direction so that the longitudinal positions of the central axes of the lithium-ion cells 11 disposed at the both longitudinal ends of each of the first and the third cell strings 12 and 14 lie at the midpoints between the central axes of the lithium-ion cells 11 disposed at the both longitudinal ends of the second cell string 13 and those of the lithium-ion cells 11 lying next thereto.

The inlet-side guide plates 23 are disposed in the side of the inlet-side passage 60 at both ends of the assembled battery 10 in the longitudinal direction at a predetermined distance from the lithium-ion cells 11. The outlet-side guide plates 24 are disposed in the side of the outlet-side passage 61 at the both ends of the assembled battery 10 in the longitudinal direction at a predetermined distance from the lithium-ion cells 11. Between the inlet-side guide plate 23 and the lithium-ion cells 11 at one end in the longitudinal direction, the inlet-side guide passage 62 through which the cooling medium 4 is guided from the inlet-side passage 60 is formed. Between the outlet-side guide plate 24 and the lithium-ion cells 11 at the other end in the longitudinal direction, the outlet-side guide passage 63, which is in communication with the inlet-side guide passage 62, through which the cooling medium 4 is subsequently guided to the outlet-side passage 61 is formed. The inlet-side guide passages 62 are directed or inclined away from the assembled battery 10 from the longitudinal ends of the inlet-side passage 60 toward the outlet-side passage 61. The outlet-side guide passages 63 are directed or inclined away from the assembled battery 10 from the longitudinal ends of the outlet-side passage 61 towards the inlet-side passage 60.

The cooling medium 4 is distributed to the inlet-side guide passages 62 disposed at the both longitudinal ends and throughout the inter-cell passage 64 by the five lithium-ion cells 11 constituting the first cell string 12 serving as a diverter mechanism.

The side plates 30 of the higher potential battery block 110*a* and the lower potential battery block 110*b* serve as closure members of the outlet-side passage 61 and the inlet-side passage 60, respectively. For this reason, the side plate 30 is different from the side plate 31 in longitudinal length, which is longer than the side plate 31 and extends in the longitudinal direction more than the side plate 31 does.

The higher potential battery block 110*a* and the lower potential battery block 110*b* are in a rotationally symmetric structure around the center of the longitudinal cross-section. Therefore, in the present embodiment, the battery module 110 can be manufactured by manufacturing the identical battery blocks and connecting the side plates 31 of the battery blocks.

Furthermore, since the battery module 110 in the present embodiment supplies and discharges the cooling medium 4 in the transverse direction, the battery module 110 can be installed so as to set the longitudinal direction of the battery module 110 to be aligned with the vertical direction, in other words, the battery module 110 can be vertically installed.

The flow of the cooling medium will now be explained. When the fan disposed in the cooling duct in the in-vehicle electric system is driven, the air existing in the vehicle interior is used as the cooling medium 4 so as to flow into the inlet-side passage 60 through the cooling medium inlet duct and the cooling medium inlet 25. After getting into the inlet-side passage 60, the cooling medium 4 passes through the inlet-side passage 60 in the transverse direction, and then changes its flow direction at a right angle to one side along the height direction and flows into the assembled battery 10. At this time, the cooling medium 4 runs between the lithium-ion cells 11 constituting the first cell string 12. This causes the cooling medium 4 to be uniformly distributed to the inlet-side guide passages 62 and the inter-cell passage 64.

The cooling medium 4 distributed to the inlet-side guide passages 62 flows from the inlet-side passage 60 to the outlet-side passage 61 through the inlet-side guide passages 62 and the outlet-side guide passages 63, cooling the lithium-ion cells 11 disposed at the both longitudinal ends of the assembled battery 10. The cooling medium 4 distributed throughout the inter-cell passage 64 flows from the inlet-side passage 60 to the outlet-side passage 61 throughout the inter-cell passage 64, cooling the outer peripheral surface of each of the lithium-ion cells 11.

In the outlet-side passage 61, the cooling medium 4 changes again its flow direction at a right angle to the transverse direction and then flows in the transverse direction. Then, the cooling medium 4 is discharged outside the battery module 110 through the cooling medium outlet 26 and the cooling medium outlet duct.

According to the present embodiment described above, similarly to the first embodiment, since the thermal contact between the cooling medium 4 and each of the lithium-ion cells 11 can be improved so as to distribute the cooling medium 4 to each of the lithium-ion cells 11 at an uniform flow rate, the temperature rise of each of the lithium-ion cells 11 due to charge and discharge can be reduced and equalized. According to the present embodiment, similarly to the first embodiment, this improves the cooling efficiency of the lithium-ion cells 11 and reduces variation in charge and discharge amount and lifetime of the lithium-ion cells 11. The other operational effects can also be achieved similarly to those of the first embodiment.

According to the embodiments described above, a battery module that improves cooling performance of cells can be provided.

Moreover, according to the embodiments described above, a battery module that reduces variation in charge and discharge amount and variation in lifetime of the cells can be provided.

Moreover, according to the embodiments described above, a battery module that distributes a cooling medium introduced into the module through a cooling medium inlet throughout a plurality of cells so as to reduce cooling difference or variation between the plurality of cells can be provided.

Moreover, according to the embodiments described above, a battery module that reduces temperature variation throughout the plurality of cells from that disposed in the cooling medium inlet side to that disposed in the cooling medium outlet can be provided.

Moreover, according to the embodiments described above, a battery module that facilitates diversion of the cooling medium introduced in the module through the cooling medium inlet can be provided Moreover, according to the embodiments described above, a battery module that achieves a sophisticated cooling of the cells by a relatively simple module configuration can be provided.

Moreover, according to the embodiments described above, a battery module that achieves a sophisticated cooling of the cells by a small module configuration can be provided.

The above-described embodiments are examples, and various modifications can be made without departing from the scope of the invention.

What is claimed is:

1. A battery module, comprising:
   a housing that comprises a first plate member with an elongated shape in a flow direction of a cooling air and a second plate member provided in a position facing the first plate member with an elongated shape in the flow direction of the cooling air;
   a first cell string comprising a plurality of cells housed in the housing and arranged side by side along the first plate member with central axes of the cells in parallel;
   a second cell string comprising a plurality of cells housed in the housing and arranged side by side along the second plate member with central axes of the cells in parallel; and
   side plates that sandwich the plurality of cells housed in the housing from directions along which the central axes of the cells extend, wherein:
   the housing further comprises:
      an inlet, formed at the housing, through which the cooling air is introduced into the housing;
      an outlet, formed at the housing, through which the cooling air in the housing is discharged;
      an inlet-side guide plate provided on an inlet side of the housing;
      an outlet-side guide plate provided on an outlet side of the housing; and
      a plurality of cooling passages, formed in the housing, through which the cooling air flows;
   the first cell string and the second cell string are arranged between the first plate member and the second plate member;
   the second cell string is arranged closer to the second plate member side than the first cell string is and is arranged closer to the outlet side than the first cell string is;
   at the inlet side of the housing, the inlet is arranged closer to the first plate member than to the second cell string, at least a part between the inlet side of the second cell string and the second plate member is covered by the inlet-side guide plate, and the cooling air is introduced into the housing through the inlet so as to form a flow of the cooling air along the first plate member and a flow of the cooling air along the inlet-side guide plate;
   at the outlet side of the housing, the outlet is arranged closer to the second plate member than to the first cell string, and at least a part between the outlet side of the first cell string and the first plate member is covered by the outlet-side guide plate;
   the plurality of cooling passages comprises:
      a first cooling passage that is formed between the first cell string and the first plate member and extends along the first plate member from the inlet;
      a second cooling passage that is formed between the second cell string and the second plate member and extends along the second plate member to the outlet;
      a third cooling passage that is formed in between the cells and allows the first cooling passage and the second cooling passage to be in communication with each other;
      a fourth cooling passage that is formed between the inlet-side guide plate and cells disposed closest to the inlet side of the first cell string and the second cell string and extends from the inlet to the second cooling passage; and
      a fifth cooling passage that is formed between the outlet-side guide plate and cells disposed closest to the outlet side of the first cell string and the second cell string and extends from the first cooling passage to the outlet;
   the third cooling passage is a cooling passage, using the plurality of cells as passage forming members, that is formed by sandwiching the plurality of cells with the side plates from the directions along which the central axes of the cells extend, so as to form a gap between the neighboring cells;
   the inlet opens on an extension of a line along which the first cell string is arranged; and
   at the inlet side of the housing, the cooling air collides with a cell disposed closest to the inlet side of the first cell string so as to form the flow of the cooling air along the first plate member and the flow of the cooling air along the inlet-side guide plate,
   wherein the plurality of cooling passages are arranged such that:
      cooling air entering the inlet is divided into a flow in the first cooling passage and a flow in the fourth cooling passage;
      the flow in the first cooling passage is divided into a flow in the third cooling passage and a flow in the fifth cooling passage;
      the flow in the third cooling passage and the flow in the fourth cooling passage combine into a flow in the second cooling passage; and
      the flow in the second cooling passage and the flow in the fifth cooling passage combine and flow through the outlet.

2. A battery module according to claim 1, further comprising:
   a discharge chamber, kept in isolation from a space in the housing, into which a discharge medium is discharged from the cells when a safety valve of the cells is opened due to an increase in internal pressure of the cells caused by a temperature rise in case of an abnormality of the cells.

3. A battery module according to claim 2, further comprising:
- connection conductors for electrically connecting the cells, the connection conductors being embedded in the side plates; and
- a cover member, disposed outside the housing, that covers each of the pair of side plates, wherein:
- the discharge chamber is formed with each of the pair of side plates and the cover member.

4. A battery module according to claim 1 wherein:
- a height h1 is smaller than a height h2, where the height h1 represents a height of the first cooling passage between the first cell string side of the first plate member and a region closer to the first plate member of the first cell string, and the height h2 represents a height of the second cooling passage between the second cell string side of the second plate member and a region closer to the second plate member of the second cell string;
- a gap δ1 and a gap δ2 are substantially equal to each other in width, where the gap δ1 denotes a minimum gap between cells next to each other in an arrangement direction of cells of each of the first and second cell strings, and the gap δ2 denotes a minimum gap between the first and second cell strings side of the inlet-side guide plate and a cell arranged closest to the inlet side of each of the first and second cell strings and a minimum gap between the first and second cell strings side of the outlet-side guide plate and a cell arranged closest to the outlet side of each of the first and second cell strings;
- a cell arranged most upstream of a flow of the cooling air introduced into the housing through the inlet divides a mainstream of the cooling air into a plurality of substreams; and
- the plurality of cells of each of the first and second cell strings are cooled by the cooling air passing through the first cooling passage, the second cooling passage, the gap δ1, and the gap δ2.

5. A battery module according to claim 4, wherein:
- the gap δ1 is at least 0.03 times as large as a diameter of the cell; and
- the height h1 is at least 0.25 times and at most 0.5 times as the diameter of the cell.

6. An electric storage device, comprising:
- the battery module according to claim 1, that comprises the cells electrically connected with one another in series; and
- a battery control device that controls a state of each of the cells and notifies a higher-rank control device of the state of each the cells.

7. An electric system, comprising:
- an electric machine that generates a drive power by an electric power;
- an electric power conversion device that is electrically connected to the electric machine so as to control the electric power to be supplied to the electric machine; and
- an electric storage device that is electrically connected to the electric power conversion device so as to supply the electrical power to the electric power conversion device as a power source for the electric machine, wherein:
- the electric storage device comprises a battery module that comprises a plurality of cells electrically connected with one another in series and that is electrically connected to the electric power conversion device, and a battery control device that controls a state of each of the cells and notifies a controller of the electric power conversion device of the state of each of the cells; and
- the battery module is the battery module according to claim 1.

* * * * *